(12) United States Patent
Mathews et al.

(10) Patent No.: US 11,914,532 B2
(45) Date of Patent: Feb. 27, 2024

(54) MEMORY DEVICE BANDWIDTH OPTIMIZATION

(71) Applicant: Apple Inc., Cupertino, CA (US)

(72) Inventors: Gregory S. Mathews, Saratoga, CA (US); Shane J. Keil, San Jose, CA (US)

(73) Assignee: Apple Inc., Cupertino, CA (US)

( * ) Notice: Subject to any disclaimer, the term of this patent is extended or adjusted under 35 U.S.C. 154(b) by 10 days.

(21) Appl. No.: 17/655,324

(22) Filed: Mar. 17, 2022

(65) Prior Publication Data

US 2023/0063772 A1    Mar. 2, 2023

Related U.S. Application Data

(60) Provisional application No. 63/239,361, filed on Aug. 31, 2021.

(51) Int. Cl.
*G06F 13/16* (2006.01)
*G06F 1/06* (2006.01)

(52) U.S. Cl.
CPC ........... *G06F 13/1684* (2013.01); *G06F 1/06* (2013.01); *G06F 13/1647* (2013.01)

(58) Field of Classification Search
CPC ..... G06F 13/1684; G06F 13/1647; G06F 1/06
See application file for complete search history.

(56) References Cited

U.S. PATENT DOCUMENTS

| | | | |
|---|---|---|---|
| 6,671,761 B2 | 12/2003 | Kim | |
| 9,588,840 B2 | 3/2017 | Chung et al. | |
| 9,804,793 B2 * | 10/2017 | Tomishima | G06F 3/0619 |
| 10,255,964 B2 * | 4/2019 | Shin | G11C 11/4096 |
| 10,490,239 B2 * | 11/2019 | Tomishima | G11C 7/1015 |
| 10,777,242 B2 | 9/2020 | Park et al. | |
| 10,985,738 B1 | 4/2021 | Penney | |

(Continued)

FOREIGN PATENT DOCUMENTS

TW    202122993 A1    6/2021

OTHER PUBLICATIONS

International Search Report and Written Opinion in PCT Appl. No. PCT/US2022/040767 dated Dec. 6, 2022, 9 pages.

(Continued)

*Primary Examiner* — Brian T Misiura
(74) *Attorney, Agent, or Firm* — Kowert, Hood, Munyon, Rankin & Goetzel, P.C.; Dean M. Munyon

(57) ABSTRACT

Techniques for scheduling memory operations are disclosed in which alternate read/write commands within a multi-bank memory operation are delayed beyond a minimum timing parameter in order to increase memory data bus utilization. The remaining read/write commands are not delayed beyond the minimum timing parameter. Every other clock cycle (e.g., even clock cycles) within the memory operation is reserved for activate commands, while other commands such as sync and read/write are scheduled on the intervening clock cycles (e.g., odd clock cycles). For memory devices for which a sync command (which causes a clock of the memory data bus to start) is to precede a corresponding read/write command by a number of clock cycles that would place it in a cycle reserved for activate commands, a particular operation mode is disclosed in which the memory device internally delays a received sync command.

20 Claims, 21 Drawing Sheets

(56) References Cited

U.S. PATENT DOCUMENTS

| | | | |
|---|---|---|---|
| 11,562,781 B1* | 1/2023 | Zitlaw | G11C 7/1009 |
| 2012/0155200 A1* | 6/2012 | Moon | G11C 8/12 |
| | | | 365/230.01 |
| 2017/0140810 A1* | 5/2017 | Choi | G11C 11/40618 |
| 2017/0286017 A1 | 10/2017 | Ware et al. | |
| 2018/0232157 A1 | 8/2018 | Seo | |
| 2019/0171598 A1* | 6/2019 | Zhu | G06F 1/08 |
| 2020/0174705 A1 | 6/2020 | Qawami et al. | |
| 2021/0011868 A1 | 1/2021 | Kim et al. | |
| 2021/0200433 A1 | 7/2021 | Xu et al. | |
| 2021/0233593 A1 | 7/2021 | Palmer | |
| 2023/0021725 A1* | 1/2023 | Gao | G11C 7/222 |

OTHER PUBLICATIONS

Abu Sebastian et al. "Memory devices and applications for in-memory computing," Nature Nanotechnology, Mar. 30, 2020, pp. 529-544.

Office Action in Taiwanese Appl. No. 111132800 dated Oct. 16, 2023, 6 pages.

* cited by examiner tRCDr=15  
RL=17

Clock Cycle Number

| Bank | CMD Bus | | | | Data Bus | |
|---|---|---|---|---|---|---|
| | Activate 1 | Activate 2 | Sync | RD | Data 1 | Data 2 |
| A | 0 | 1 | (15) | 16 | 33 | (37) |
| B | 2 | 3 | | 18 | 35 | (39) |
| C | 4 | 5 | | 20 | (37) | (41) |
| D | 6 | 7 | | 22 | (39) | (43) |
| E | 8 | 9 | | 24 | (41) | (45) |
| F | 10 | 11 | | 26 | (43) | (47) |
| G | 12 | 13 | | 28 | (45) | 49 |
| H | 14 | (15) | | 30 | (47) | 51 |

310 tRCDr=15  
RL=17

Clock Cycle Number

| Bank | CMD Bus | | | | Data Bus | |
|---|---|---|---|---|---|---|
| | Activate 1 | Activate 2 | Sync | RD | Data 1 | Data 2 |
| A | 0 | 1 | 15 | (16) | 33 | (37) |
| B | 4 | 5 | | (20) | (37) | (41) |
| C | 8 | 9 | | (24) | (41) | (45) |
| D | 12 | 13 | | (28) | (45) | (49) |
| E | (16) | 17 | | 32 | (49) | (53) |
| F | (20) | 21 | | 36 | (53) | (57) |
| G | (24) | 25 | | 40 | (57) | (61) |
| H | (28) | 29 | | 44 | (61) | 63 |

320 tRCDr=15  
RL=17

Clock Cycle Number

| Bank | CMD Bus | | | | Data Bus | |
|---|---|---|---|---|---|---|
| | Activate 1 | Activate 2 | Sync | RD | Data 1 | Data 2 |
| A | 0 | 2 | 16 | 17 | 34 | 38 |
| B | 6 | 8 | | 23 | 40 | 44 |
| C | 12 | 14 | | 29 | 46 | 50 |
| D | 18 | 20 | | 35 | 52 | 56 |
| E | 24 | 26 | | 41 | 58 | 62 |
| F | 30 | 32 | | 47 | 64 | 68 |
| G | 36 | 38 | | 53 | 70 | 74 |
| H | 42 | 44 | | 59 | 76 | 80 |

330 ↗ No contention, but data bus has "holes" at 36-37, 42-43, 48-49, 54-55, 60-61, 66-67, 72-73, 78-79

FIG. 3C tRCDr=15  
RL=17

Clock Cycle Number

| Bank | CMD Bus | | | | Data Bus | |
|---|---|---|---|---|---|---|
| | Activate 1 | Activate 2 | Sync | RD | Data 1 | Data 2 |
| A | 0 | 2 | (16) | 17 | 34 | (38) |
| B | 4 | 6 | | 21 | (38) | (42) |
| C | 8 | 10 | | 25 | (42) | (46) |
| D | 12 | 14 | | 29 | (46) | (50) |
| E | (16) | 18 | | 33 | (50) | (54) |
| F | 20 | 22 | | 37 | (54) | (58) |
| G | 24 | 26 | | 41 | (58) | (62) |
| H | 28 | 30 | | 45 | (62) | 66 |

340 ↗

FIG. 3D tRCDr=15  
RL=17

Clock Cycle Number

| Bank | CMD Bus | | | | Data Bus | |
|---|---|---|---|---|---|---|
| | Activate 1 | Activate 2 | Sync | RD | Data 1 | Data 2 |
| A | 0 | 2 | (18) | 19 | 36 | 40 |
| B | 4 | 6 | | 21 | 38 | 42 |
| C | 8 | 10 | | 27 | 44 | 48 |
| D | 12 | 14 | | 29 | 46 | 50 |
| E | 16 | (18) | | 35 | 52 | 56 |
| F | 20 | 22 | | 37 | 54 | 58 |
| G | 24 | 26 | | 43 | 60 | 64 |
| H | 28 | 30 | | 45 | 62 | 66 |

↗ 350

Accesses to Banks A, C, E, G:  
RD occurs at tRCDr + 2 = 17 cycles

Accesses to Banks B, D, F, H:  
RD occurs at tRCDr = 15 cycles

FIG. 3E tRCDr=15  
RL=17

Clock Cycle Number

| Bank | CMD Bus | | | | Data Bus | |
|---|---|---|---|---|---|---|
| | Activate 1 | Activate 2 | Sync | RD | Data 1 | Data 2 |
| A | 0 | 2 | 17 | 19 | 36 | 40 |
| B | 4 | 6 | | 21 | 38 | 42 |
| C | 8 | 10 | | 27 | 44 | 48 |
| D | 12 | 14 | | 29 | 46 | 50 |
| E | 16 | 18 | | 35 | 52 | 56 |
| F | 20 | 22 | | 37 | 54 | 58 |
| G | 24 | 26 | | 43 | 60 | 64 |
| H | 28 | 30 | | 45 | 62 | 66 |

↗ 360

Memory Placed into Sync Delay Mode  
(Sync internally delayed within memory  
by 1 cycle)

FIG. 3F

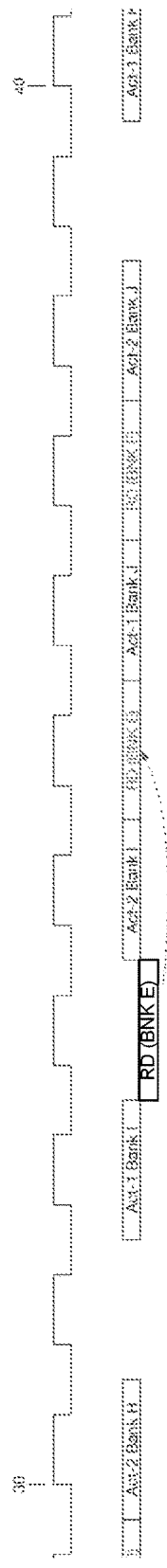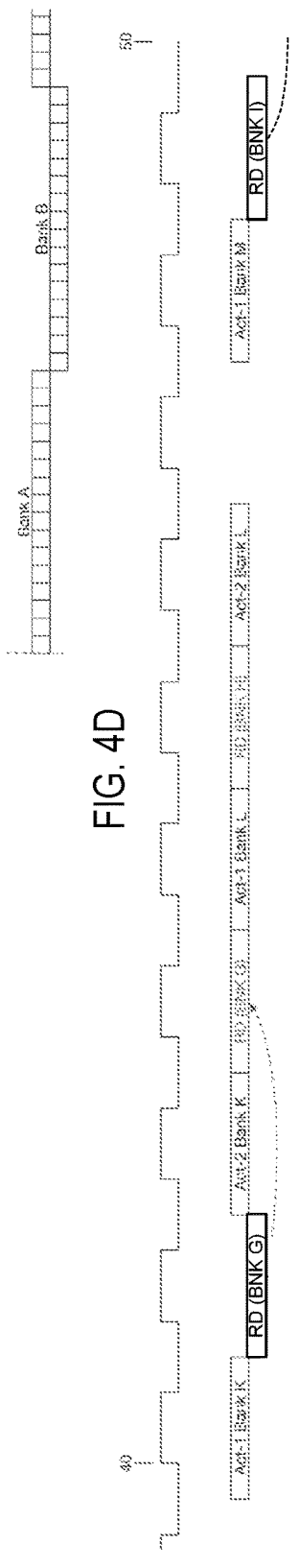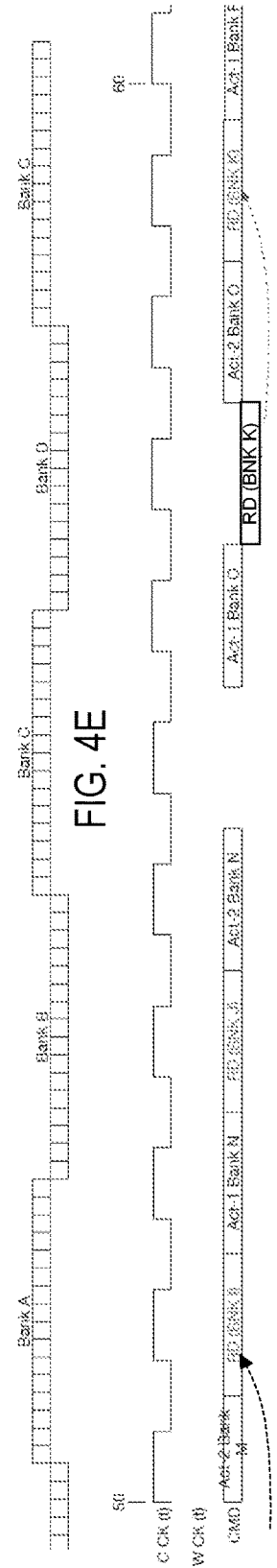
FIG. 4D
FIG. 4E
FIG. 4F

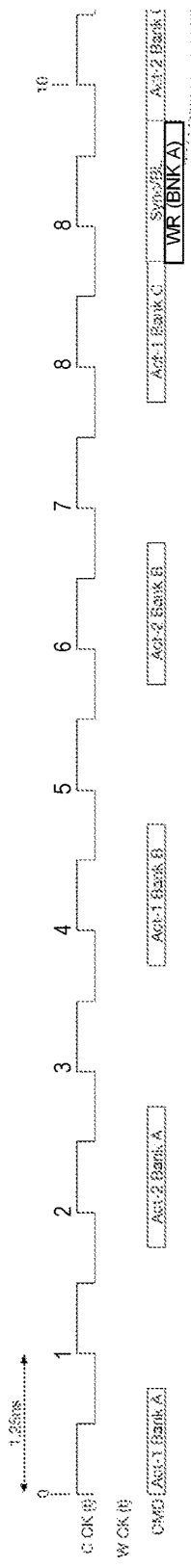
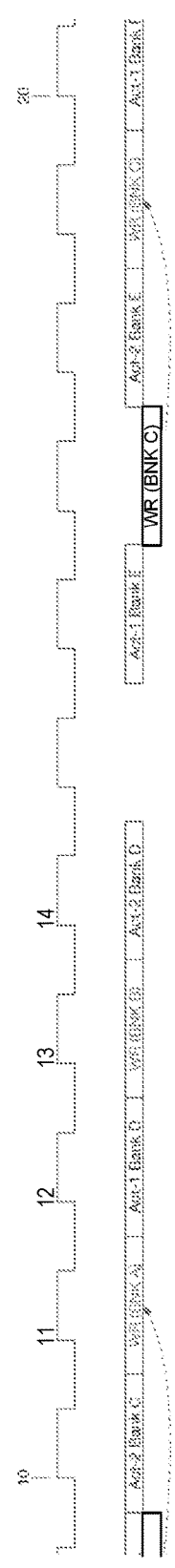
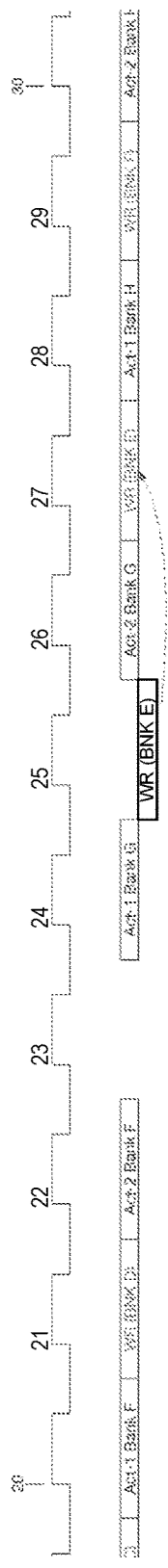
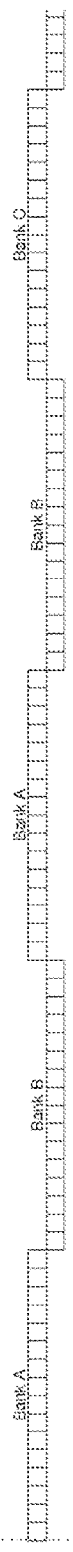
FIG. 5A
FIG. 5B
FIG. 5C

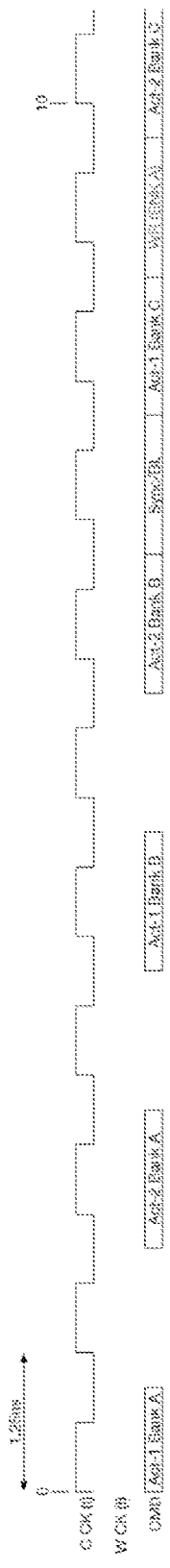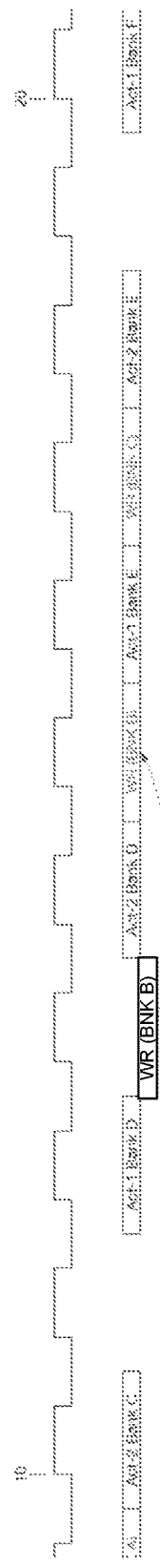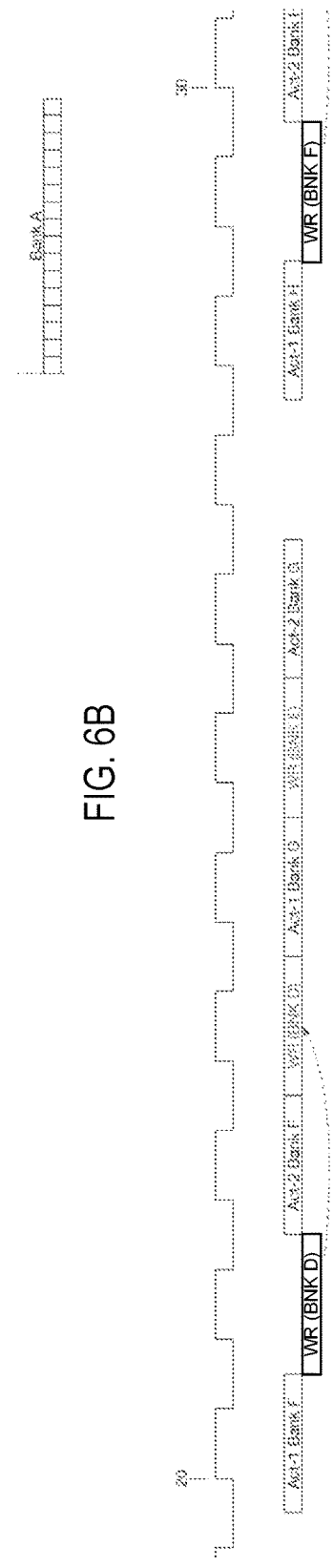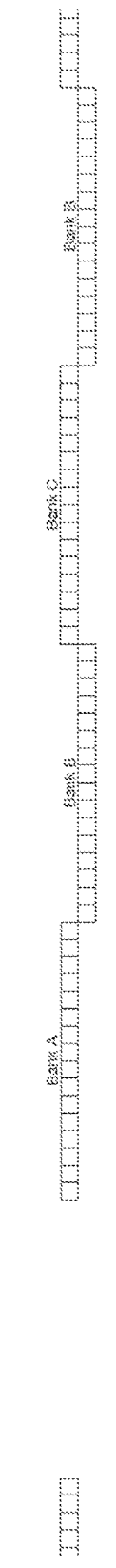
FIG. 6A
FIG. 6B
FIG. 6C

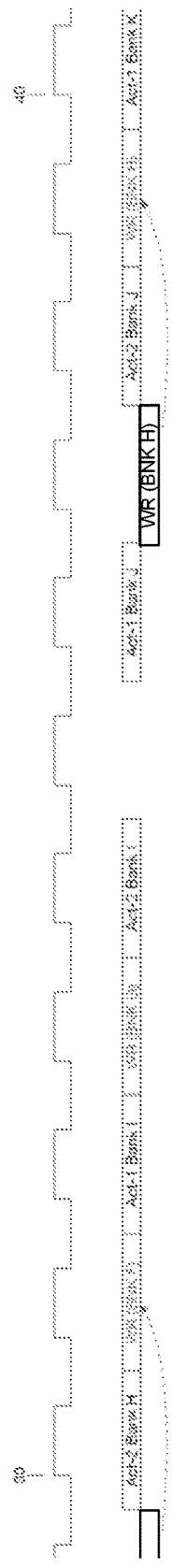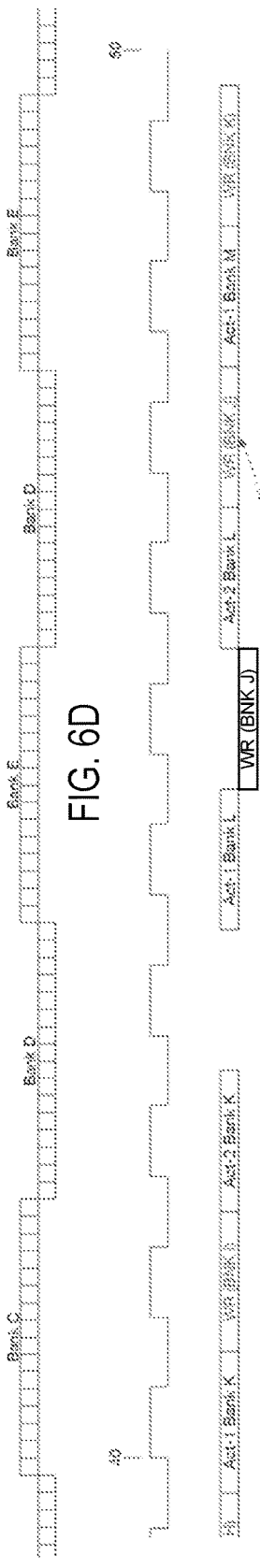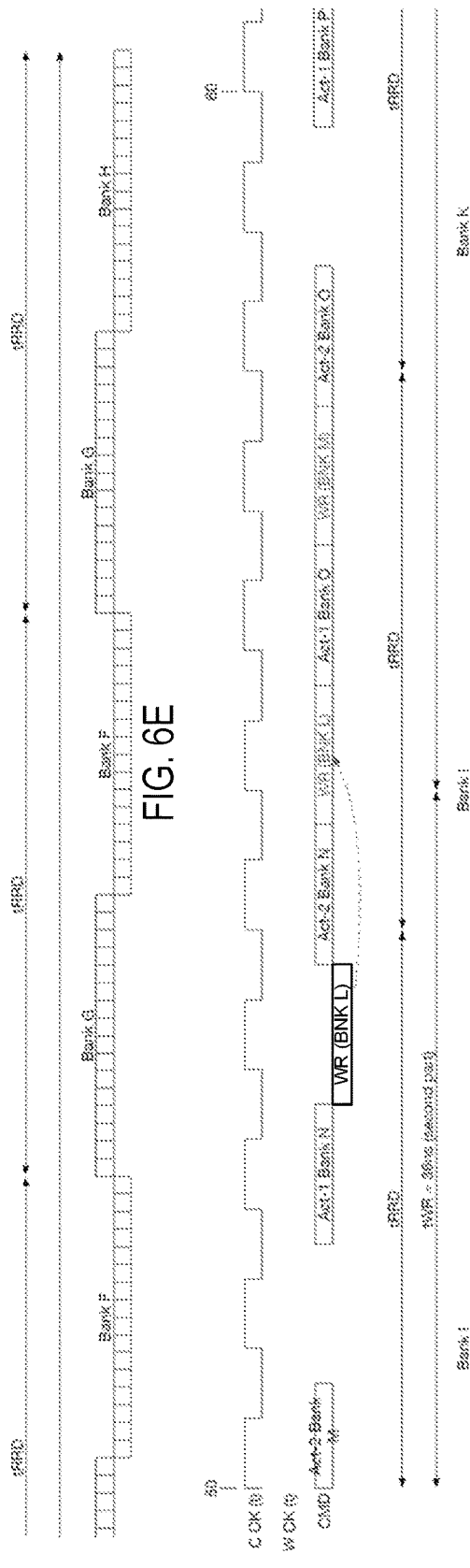
FIG. 6D
FIG. 6E
FIG. 6F

MEMORY DEVICE BANDWIDTH OPTIMIZATION

CROSS-REFERENCE TO RELATED APPLICATIONS

The present application claims priority to U.S. Provisional Application No. 63/239,361, entitled "Memory Device Bandwidth Optimization," filed Aug. 31, 2021, the disclosure of which is incorporated by reference herein in its entirety.

BACKGROUND

Technical Field

This disclosure relates generally to memory controllers and, more particularly, to scheduling memory commands in a manner that increases utilization of a data bus of a memory device.

Description of the Related Art

One common type of computer memory that has been in use for decades is dynamic random-access memory (DRAM), which is a form of random-access memory (RAM) that requires periodic refreshes to retain the data stored therein. Older DRAM implementations were asynchronous, meaning that a system clock is not used to coordinate memory accesses, while many more recent implementations are synchronous (SDRAM), meaning that a clock is used to coordinate memory accesses.

Memories, including SDRAM memories, are commonly organized into sub-sections called banks. Banks are configured to operate independently from one another, such that the device can operate on a memory access command in each bank simultaneously. This allows memory devices to achieve greater concurrency and higher data rates. One type of SDRAM is Low-Power Double Data Rate (LPDDR SDRAM), which consumes less power than other implementations and thus is well suited for applications such as mobile computing.

International semiconductor memory standards have promoted high-volume markets for various electronic products by ensuring compatibility between products offered by different vendors. JEDEC, short for the Joint Electron Device Engineering Council, publishes standards for many different microelectronic technologies. In February 2019, JEDEC published JESD209-5, Standard for Low Power Double Data Rate 5 (LPDDR5, or LP5). This standard supports data transfer rates of 6400 Mbps, and up to 16 banks per memory device.

BRIEF DESCRIPTION OF THE DRAWINGS

The present disclosure sets forth, with reference to the following figures, techniques for scheduling operations for a memory device.

FIGS. 3A-F illustrate contention and bus efficiency for different possible schedules for a set of memory operations.

FIGS. 4A-J illustrate different portions of a timing diagram for a memory read operation that uses a "2-6" cadence.

FIGS. 5A-J illustrate different portions of a timing diagram for a memory write operation that uses a "2-6" cadence.

FIGS. 6A-J illustrate different portions of a timing diagram for a memory write operation that uses a "6-2" cadence.

DETAILED DESCRIPTION

Figure 1:
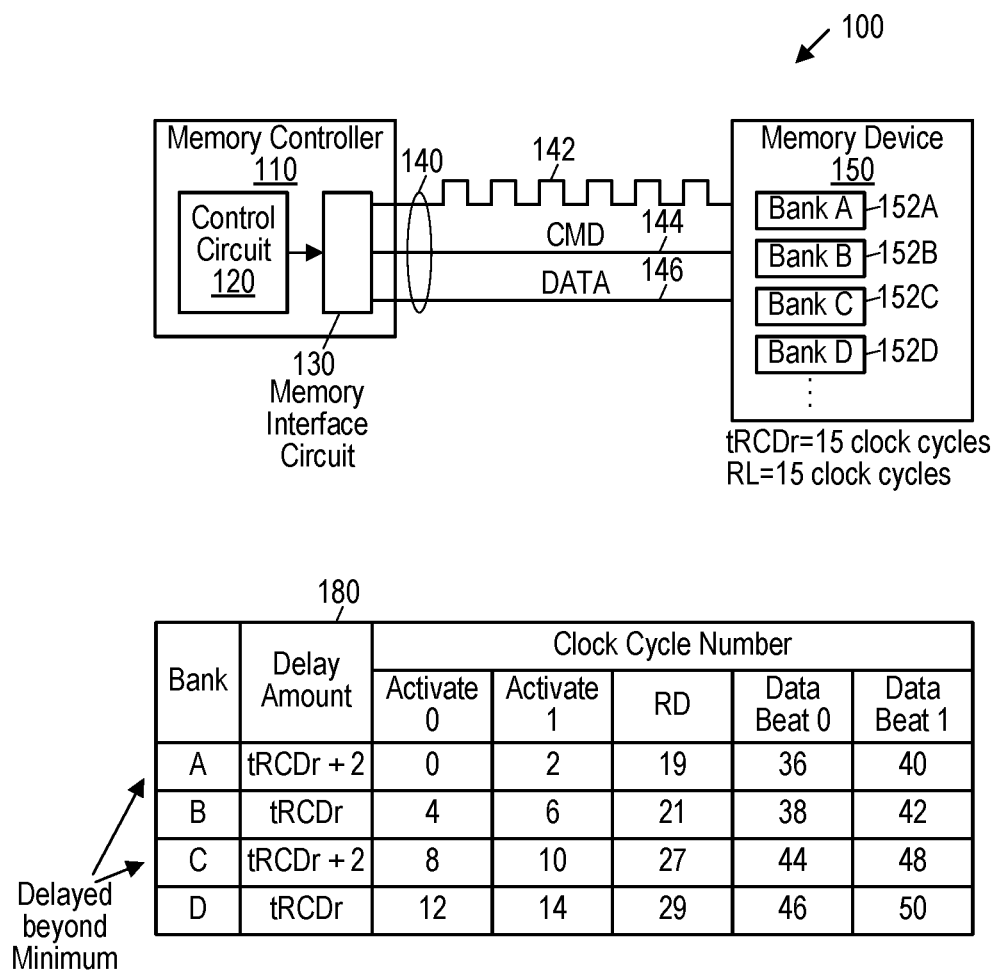
FIG. 1 is a block diagram illustrating one embodiment of a scheduling paradigm for a multi-bank memory operation.

The LP5 high-frequency interface presents several challenges when attempting to extract high-bandwidth utilization of the data bus. The standard specifies that two activate commands are required for a particular memory bank, each issued on different clock signals. Furthermore, under the standard, a sync command is required to start the data clock for the memory. In one mode, this command is issued one clock cycle prior to the read or write command. (Alternatively, an "always on" mode may be used, but this mode can burn significant power, which is usually undesirable.) Data for a read or write to a particular memory bank is transmitted in two beats of two clocks each. These beats, however, cannot be back-to-back, as the LP5 memory cannot produce (or store) the data that quickly at high frequency. Accordingly, there are two dead clock cycles between the two beats of data. The constraints imposed by the LP5 standard thus make it difficult to achieve maximum utilization of the data bus (thereby improving performance of the memory system) while still scheduling in a way that makes the implementation of the scheduler relatively efficient.

The present disclosure outlines a scheduling paradigm that seeks to maximize memory data bus utilization while taking into account the various constraints of the LP5 standard. The present disclosure proposes that the clock cycles on the interface between the memory controller and the memory are to be divided into two sets of alternating clock cycles (e.g., even and odd clock cycles). One of these sets of clock cycles (e.g., even clock cycles) is used to transmit activate commands for various banks being addressed in a multi-bank memory operation (LP5 supports up to 16 banks for some operations). The other set (e.g., odd clock cycles) are used to transmit everything else. Accordingly, each memory bank to be addressed has two activate commands that are scheduled on consecutive even clock cycles. Other commands are scheduled on odd clock cycles between the activate commands.

Next, the present disclosure notes that the standard specifies a minimum timing delay from the end of the second activate for a given bank until the read to (or write from) that bank can occur. For the LP5 standard, this delay corresponds to the parameter RAS-to-CAS delay (tRCDr for reads, tRCDw for writes). Under one version of the proposed scheduling paradigm, a first read/write in a set of transactions is delayed by two clock cycles beyond its specified tRCD value. The second read/write command is then scheduled in the next consecutive odd clock cycle. This aligns the data beats of the two commands so that they properly interleave. The third command is delayed six clock cycles (three even and three odd clock cycles) from its normal timing so that the first beat comes immediately after the second beat of the second command. The fourth command is two clocks after the third command. This "2-6" pattern repeats throughout the memory transaction, with the result that the data bus can achieve full utilization as will be shown below in various timing diagrams. A "6-2" timing pattern can also achieve similar results. Either of these paradigms can be implemented efficiently by the scheduler.

More generally, it can be said that under this paradigm, alternating ones of the read/write commands for a multi-bank memory operation are scheduled to be delayed by a multi-cycle window beyond the minimum timing delay. In the embodiment shown in FIG. 1, the length of this multi-cycle window is two clock cycles, but it may be longer for other embodiments if warranted by the characteristics of the particular memory device being addressed.

FIG. 1 illustrates an example of this scheduling paradigm. As shown, apparatus 100 includes a memory controller 110 that is coupled to memory device 150 via an interface 140 that includes command clock signal 142, command bus 144, and data bus 146. Various possible additional components within apparatus 100 are discussed with respect to FIG. 8. FIG. 9 illustrates that apparatus 100 may any of a variety of types of electronic products. Memory device 150 may be any of a variety of DRAM devices, including those compliant with JEDEC JESD209-5, Low Power Double Data Rate 5 (LPDDR5).

Memory controller 110 includes a memory interface circuit 130 configured to couple to memory device 150 via interface 140. Memory device 150 includes a plurality of memory banks 152. Memory controller 110 further includes a control circuit 120 coupled to memory interface circuit 130 and configured to initiate a multi-bank memory operation such as a burst operation. The multi-bank memory operation is initiated by scheduling a sequence of bank-specific commands to be sent over command bus 144 to memory device 150.

One example of timing for scheduling bank-specific commands to four banks (Banks A-D) is shown in table 180. Generally, the bank-specific commands for a given memory bank include a) a first activate command, b) a second activate command two cycles of command clock signal 142 later, and c) a read/write command that follows the second activate command by at least a minimum timing parameter specified for the memory device. As its name suggests, the read/write command specifies a type of operation to be performed (i.e., whether it is a read or write operation). FIG. 1 depicts a read operation. In this example, the minimum timing parameter is referred to as the RAS-to-CAS delay, or tRCDr for read operations. In the example shown, tRCDr=15 clock cycles. The quantity RL, which specifies the delay between the read command and data appearing on the bus, is 17 clock cycles.

As can be seen from table 180, every other read command during the multi-bank memory operation is scheduled to be delayed beyond minimum timing parameter tRCDr. Here, the read commands for Banks A and C are delayed by 2 clock cycles. Remaining read commands for Banks B and D are not delayed beyond tRCDr. Note that there is a similar timing parameter for writes (tRCDw).

The result of delaying alternating read/write commands during the multi-bank memory operation beginning with the first read/write command is that these commands are scheduled in a repeating 2-cycle/6-cycle ("2/6") cadence. In one iteration of this cadence, read/write commands for a first given bank (e.g., Bank A) and a second, successive given bank (e.g., Bank B) are scheduled two cycles apart. A single iteration of the cadence further includes read/write commands for the second given bank (Bank B) and a third, successive given bank (Bank C) being scheduled six cycles apart. In another embodiment, alternating read/write commands beginning with the second read/write command results in a repeating 6-cycle/2-cycle ("6/2") cadence. In this embodiment, the accesses to Banks A and B are scheduled 6 cycles apart, while accesses to Banks B and C are scheduled 2 cycles apart.

It can also be seen from table 180 that control circuit 120 is configured to schedule an activate command in every other clock cycle of command bus 144 to perform the multi-bank memory operation. In the illustrated example, activate commands are scheduled in even clock cycles, with other commands being scheduled in odd clock cycles. The combination of scheduling activate commands in every other clock cycle, along with scheduling read/write commands in intervening clock cycles, leads to greater utilization of bandwidth of data bus 146. In fact, for certain memory operations that address each of the plurality of banks in memory device 150 in a pass that begins with an initial bank and ends with a final bank, control circuit 120 can schedule commands such that, during a particular pass through the plurality of banks, there is full utilization of the data bus during a time period between which data for the initial bank and data for the final bank is present on the data bus. Indeed, table 180 illustrates that the data bus 146 is fully utilized once data for the read operation begins appearing on the bus in cycle 36.

Figure 2:
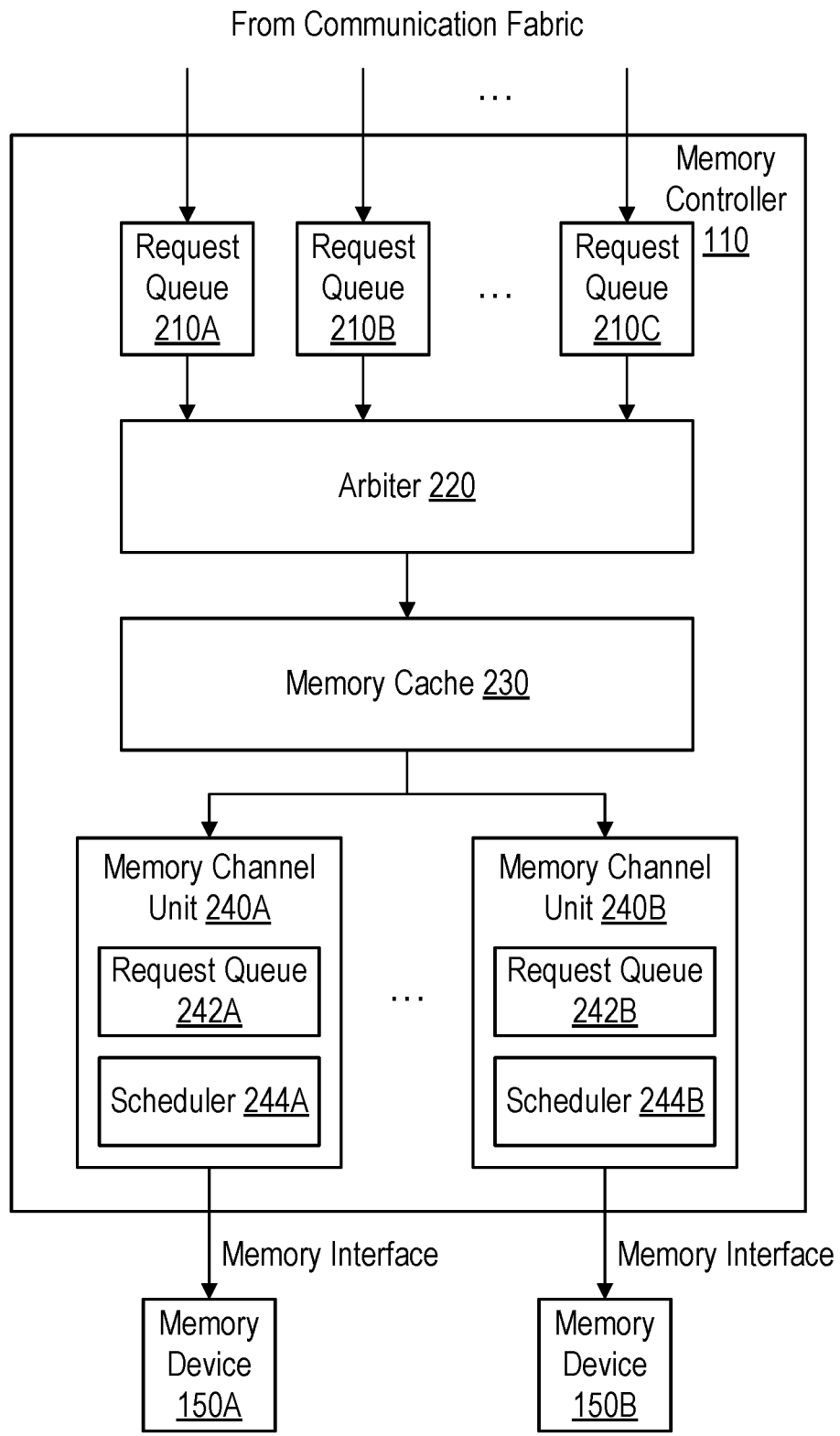
FIG. 2 is a block diagram illustrating an embodiment of a memory controller that may be used to implement the disclosed techniques.

Turning now to FIG. 2, a block diagram of one embodiment of memory controller 110 from FIG. 1 is depicted. Memory controller 110 receives memory requests from various components in the system (e.g., processors such as central processing units (CPUs) within a processor cluster, graphics processing units (GPUs), peripherals, etc.) over a communication fabric. In one embodiment, the communication fabric may include multiple independent interconnects. For example, one interconnect may transport memory requests from the CPU processors; another interconnect may transport memory requests from the GPUs; and still another interconnect may transport memory requests from the peripherals. In another embodiment, the communication fabric may include a single interconnect and memory requests may be merged from the various source components to memory controller 110 over the interconnect.

Memory controller 110 may include one or more request queues 210 to temporarily the store the memory requests until they can be serviced. In one embodiment, memory controller 110 may retain the requests in request queues 210 until they are complete (returning data to the source component for a read, or a completion for certain write requests). In another embodiment, some write requests (so-called posted writes) do not receive a completion, but still may be tracked in the request queues until the write data has been written to the memory (or to the memory cache as discussed below).

Arbiter circuit 220 may select among the memory requests in queues 210A-C for servicing. Arbiter circuit 220 may consider a variety of factors in selecting memory requests. For example, in an embodiment, the requests may be assigned to traffic classes in a quality-of-service (QoS) mechanism, and the traffic classes may be a factor in selection. Higher-priority traffic classes may be selected more frequently, over time, than lower-priority traffic classes. Balancing the priority of the traffic classes may be fairness and forward progress factors that ensure that no traffic class or priority level is blocked indefinitely. Age of the requests (e.g., how long the requests have been in the request queues) may also be a factor.

Requests that win arbitration may access memory cache 230, which stores previously accessed data from the memory. Memory requests that hit in memory cache 230 may read or write the data in the cache and may thus be complete. The memory cache may reduce the latency of the memory requests, and may also conserve power that would have been expended transmitting the memory requests to the memory devices. Other embodiments may not include a memory cache, as desired.

The memory requests that miss in memory cache 230 may be forwarded to the memory device(s) controlled by memory controller 110. Memory controller 110 may control one or more memory devices 150 within the memory, and may include a memory channel unit (MCU) 240 to interface to each memory device. The memory address space that is mapped to memory controller 110 may be apportioned to the memory devices controlled by the memory controller, and thus a given memory request may be supplied by memory cache 230 to a given MCU 250 based on the address of the memory request and which of the memory devices is mapped to that memory device. For example, certain bits of the memory address may be decoded to identify a "plane," where each memory address having the same value for the certain bits may be transmitted to the same MCU/memory device. In one embodiment, memory cache 230 may be divided into planes as well. Accordingly, multiple memory requests to different planes may access the memory cache in parallel.

MCUs 240 include request queues 242 to store the requests awaiting transmission to memory devices 150, as well as a scheduler circuit 244 configured to schedule the requests for transmission. (Scheduler circuit 244 may be said to correspond to control circuit 120 in FIG. 1.) Notably, a given memory request may include multiple transmissions on the interface to the memory device to perform the request, as is the case for a burst operation.

If the page that includes the data being accessed is not yet open, then an activate command is transmitted. Once the page is open, a read or write command is transmitted, and subsequently the data is transmitted (for a write) or received (for a read). As previously described, scheduler circuit 244 may schedule activates and read/write commands as well as certain other commands (e.g., a sync command to turn on the read/write clocks in the memory device, which may optionally be turned off when the memory device is not being addressed; refresh commands to ensure data remains correctly stored in the memory device; etc.).

Scheduler circuit 244 is configured to schedule commands in a manner that accords with the specification for the memory system, as different memories have different protocols and timing requirements. Within this framework, scheduler circuit 244 is configured to attempt to schedule the commands in a fashion that efficiently utilizes the bandwidth of the memory device. For example, reads may be grouped together and writes may be grouped separately, since one or more clock cycles of bus turnaround are required on the data bus when switching between reads and writes. Within the groups, memory requests may be sub-grouped based on accessing different banks (so different pages may be open in the different banks) or accessing the same page in the same bank, so the activate for the page may be shared among the requests. Furthermore, scheduling of the commands by scheduler circuit 244 may be performed to increase data bandwidth as briefly described with respect to FIG. 1 and as described more fully below.

Memory devices 150 within the memory may be any suitable type of memory, including any DRAM memory. More particularly, the DRAM may be a double data rate (DDR) DRAM that is implemented according to an industry-standard specification such as DDR1, DDR2, DDR3, etc. and/or one of the low-power specifications of DDR DRAM, such as LP3, LP4, etc., in addition to the LP5 specification. In some embodiments, memory device 150 may be single inline memory module (SIMM) or dual inline memory module (DIMM) containing multiple memory chips mounted on an underlying substrate. Memory device 150 may also include a plurality of banks in various embodiments.

The techniques of the present disclosure, while developed in response to the context of the LP5 memory standard, are not intended to be solely limited to memories conforming to this standard. Rather the techniques of the present disclosure may be applicable to other memory systems where similar problems in increasing data bus utilization are encountered, including, but not limited to, future LP5 memory standards and other low-power double data rate RAM standards.

It is noted that MCUs 240 may include the physical layers circuits (PHY) for driving and receiving the signals over the interface to the memory devices. Alternatively, the PHY circuits may be inserted between the MCUs and the memory devices.

Read data returned from the memory may be provided by MCUs 240 to request queues 210 that are coupled to the communication fabric, for return to the source components. Similarly, if a given write command includes a response, the response may be provided by MCUs 240 to request queues 210, or to a corresponding set of output queues. The return data paths are not shown in FIG. 2 for simplicity.

Turning now to FIGS. 3A-F, recall the various constraints imposed by the LP5 memory standard. First, memory banks require two activation cycles. Second, there are various timing parameters that must be taken into account, including the timing between the second activate for a bank and a read or write to that bank (e.g., tRCDr=15 cycles for a read in one embodiment), and the timing between the read or write and the data (e.g., 17 cycles for a read in one embodiment). Third, because of the frequency of the LP5 memory, data for an access appears on the data bus as two beats of two cycles each, with idle time in between. Finally, the LP5 standard specifies that, in one mode, the sync command (which starts the data clock) is to be scheduled to occur the cycle before the first read or write in a multi-bank memory operation. (As has been noted, there are other options for the sync in LP5, such as always on mode, but this mode consumes much more power.)

Power consumption is one of several design considerations that are taken into account when attempting to schedule memory operations. In addition to being judicious in turning on the data bus clock, it is also important to make sure that the data bus is maximally utilized during a memory operation—that is, the number of data "holes" (i.e., bus cycles with no data) is kept to a minimum. Some amount of non-utilization is inevitable, particularly when initiating a transaction or switching from a series of reads (e.g., a "read turn") to a series of writes (e.g., a "write turn"). Accordingly, the present inventors have sought to achieve as much memory data bus utilization as possible during a single pass through the banks of a memory device. But in doing so, care must be taken to ensure that there will not be contention on either the command bus or the data bus. In other words, a scheduling regime cannot be adopted that would result in two commands (or two beats of data from different banks) needing to appear on the command bus or the data bus at the same time.

Given these various challenges, it is apparent that there are many different possible ways to schedule LP5 memory transactions. But as will be shown below, many of these possibilities would result in scenarios that lead to undesirable outcomes, including data holes, command bus contention, and/or data bus contention. Several of these possibilities are described with respect to FIGS. 3A-E. A scheduling paradigm which maximizes bus utilization but which does not suffer from command or data bus contention is then described with respect to FIG. 3F.

FIGS. 3A-F are all tables describing the timing of various aspects of read accesses to eight memory banks labeled A-H. (The timing of write accesses would be similar to that shown for reads.) Activities occurring on the command and data buses are both shown. On the command bus, the timing of the two activate commands for a given bank, the sync command that precedes the first read, and the RD command are all shown, while on the data bus, the timing of the two beats of data is shown. Recall that each beat of data is two clock cycles long. Accordingly, a data beat that begins at cycle 33 ends at cycle 34.

The timing of the read command is governed by the memory parameter tRCDr, which is 15 clock cycles in our example. As previously stated, this parameter means that the soonest a read (RD) command for a given bank may occur is 15 clock cycles after the second activate for that bank. Thus, if the second activate for a bank is at clock cycle 2, the soonest the RD command may be issued for that bank is at clock cycle 17. Similarly, the timing between an RD command and the corresponding data appearing on the data bus is given by the parameter RL, which in the example is equal to 17 clock cycles.

Figure 3A:

FIG. 3A illustrates a table 310 that indicates the resultant timing if activate commands are issued one after the other with no spacing—that is, on cycles 0 and 1 for Bank A, cycles 2 and 3 for Bank B, etc. Table 310 shows that this approach will result in contention on both the command and data buses. Specifically, the sync command, which is to be scheduled at cycle 15 because it is one cycle before the RD at cycle 16, would conflict with the second activate for Bank H. Moreover, it can be seen that the data bus would also have major contention using this schedule. (Contention in both the command and data buses is indicated in FIG. 3A by the dashed circles and adjoining lines.) This approach is therefore unusable.

Figure 3B:

FIG. 3B illustrates a table 320, which depicts an alternate approach in which the first activate commands for banks are spaced out at four-clock-cycle intervals. Accordingly, the first activate command for Bank A is at 0 cycles, the first activate command for Bank B is at 4 cycles, etc. This paradigm similarly suffers from contention. As can be seen, the RD commands for Banks A-D conflict with the first activate commands for Banks E-H. Still further, the second data beat for a given bank conflicts with the first data beat for the next bank.

FIG. 3C illustrates a table 330, which depicts yet another approach in which the first activate commands for banks are not only spaced out at six-clock-cycle intervals, but the first and second activate commands are also separated by an intervening clock cycle. For example, the activate commands for Bank A are scheduled at cycles 0 and 2, while the activate commands for Bank B are scheduled at cycles 6 and 8, etc. While this schedule results in no contention on either the command or data buses, it also results in inefficiency on the data bus. As can be seen, this paradigm results in data bus holes at cycles 36-37, 42-43, 48-49, 54-55, 60-61, 66-67, 72-73, and 78-79.

One insight that the inventors had in addressing this problem is the notion that activate commands should be scheduled every other clock cycle, with other commands scheduled on the intervening clock cycles. For example, even clock cycles might be reserved for activate commands, with other commands reserved for odd clock cycles. (Of course, activate commands could also have been scheduled on odd clock cycles, with other commands scheduled on even clock cycles.) This approach is shown in table 340 in FIG. 3D. As can be seen, this approach still suffers from two shortcomings. First, there is contention between the timing of the sync command (cycle 16, one cycle before the RD at cycle 17) and the first activate command for bank E. Second, there is also data bus contention.

A second insight of the inventors is to delay every other read/write command beyond the minimum required timing. FIG. 3E illustrates table 350, which depicts such an approach. In FIG. 3E, every other RD command (beginning with the first command) is delayed two cycles beyond the minimum system timing (e.g., beyond tRCDr). Thus, it can be seen that the delay between the second activate and the RD command is 17 cycles for accesses to banks A, C, E, and G. Conversely, the delay between the second activate command and the RD command is 15 cycles for banks B, D, F, and H. This approach results in the "2-6" timing cadence. Thus, the timing between the RDs for Banks A and B is two cycles, while the timing between the RDs for Banks B and C is six cycles. This pattern continues, as the RD timing difference is two cycles between Banks C and D, and six cycles between Banks D and E. Notably, contention on the data bus has now been eliminated. Moreover, the data bus is also fully utilized between cycles 36-66 due to data on the data bus being fully interleaved during this time period.

One scheduling issue remains with this approach. There are a variety of ways the sync command can be handled under the LP5 standard. The "always on" sync mode allows the sync command to be scheduled as desired, but this approach means that the data bus will be turned on even when not needed, unnecessarily consuming power. But scheduling the sync command in the most efficient manner possible—that is, at cycle 18, one cycle prior to the first RD command—conflicts with the second activate for Bank E.

The inventors have recognized that the problem of sync command timing can be solved by the addition of a new operating mode for memory device 150. Control circuit 120 may then be configured to set memory device 150 into a "sync delay mode." Generally speaking, this sync delay mode delays the memory device from acting on a received sync command for one or more cycles. Consider a scenario in which a memory specification indicates that a sync command is to precede a read/write by an odd number of cycles, but doing so would place the sync in a cycle reserved for activate commands. Sync delay mode can be used to internally delay the sync command in the memory for some number of odd clock cycles, with the result that the sync command appears on command bus 144 in an odd clock cycle, it will be acted upon by the memory device in an even clock cycle (as specified by the memory).

In one embodiment using such a mode, memory device 150 will internally delay a received sync command by one cycle. The effect of this is that instead of a sync command scheduled in cycle N causing the data bus clock to start in cycle N+1, a sync command scheduled in cycle N will cause the data bus clock to start in cycle N+2. This mode would allow a sync command to be scheduled on the command bus two cycles before a read or write, but the memory will effectively treat the sync as occurring one cycle before the read/write due to the internal delay.

Other amounts of sync delay are possible in alternate embodiments. The proposed sync delay mode may also be utilized in settings other than the proposed 2/6 or 6/2 timing cadences. A memory device that implements a delayed sync includes a decode circuit configured to decode various memory device commands, including commands setting a sync delay mode with a specified number of cycles of delay. The decode circuit is also configured to decode the sync command itself. Alternately, instead of a sync delay mode command, the sync command format might include as a parameter a desired number of cycles of delay, with the default being no delay.

After decoding a command, the decode circuit is configured to route the command to appropriate logic within the memory device that executes the command. For the sync command, the memory device includes a sync execution circuit that is configured to start the data bus clock. In one embodiment, the decode circuit may delay sending the sync command until the specified delay passes. In another embodiment, the sync execution circuit may include a multi-bit counter. The decode circuit, upon receiving a sync command, can pass the sync command to the sync execution circuit along with the desired amount of delay. The sync execution circuit would then program the counter with the specified delay and then start the data bus clock after the counter reaches zero. (When the sync delay mode is not active, the delay parameter will be zero and the counter may not be used.) Various other implementations of the memory device to achieve sync delay are also possible. It is further noted that the memory device may be configured to internally delay commands other than the sync command as needed for different scenarios, particularly when there is a disparity between desired memory bus scheduling and required memory device timing.

In any event, when the sync delay mode is enabled, this allows the timing set forth in FIG. 3E to be adjusted by scheduling the sync command in cycle 17 rather than in cycle 18. With memory device 150 operating in sync delay mode, scheduling the sync command in cycle 17 will produce the same effect as scheduling the command in cycle 18 without sync delay mode. The results—increased bus utilization and no contention—are shown in FIG. 3F. Additionally, the scheduling paradigm is relatively straightforward to implement within scheduler circuit 244.

Furthermore, there is no loss of latency or efficiency with this approach in terms of switching from a write turn to a read turn, or vice versa. Consider a scenario in which a write turn is occurring and the first cycle that a read could be performed is cycle 100. In previous designs, the first activate would be at cycle 83, the second activate at cycle 85, which would permit a read operation at cycle 100, assuming a tRCDr value of 15 cycles. In one implementation of the present disclosure, however, a first read (or write) in a set of transactions is delayed by two clock cycles beyond its specified tRCDr value, meaning that the first read/write would instead occur at tRCDr+2 cycles. But since the previous write activate at the end of the write turn would have occurred a sufficient number of cycles earlier, the first and second activates for the initial read in the read turn could take place at cycles 81 and 83, respectively. This timing would still allow the first read to occur at cycle 100 after a delay of tRCDr+2 cycles.

Figure 4A:
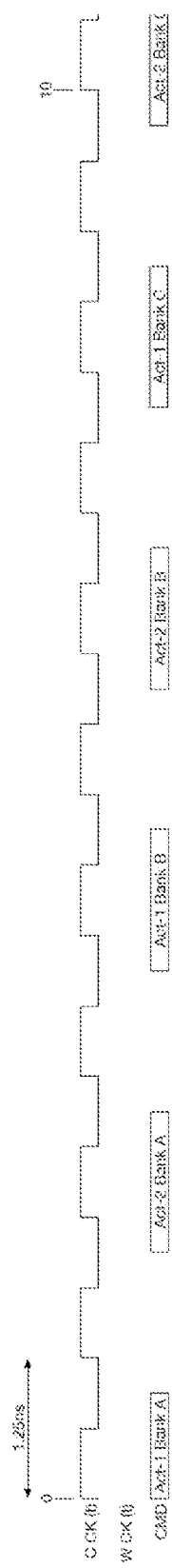
Figure 4B:
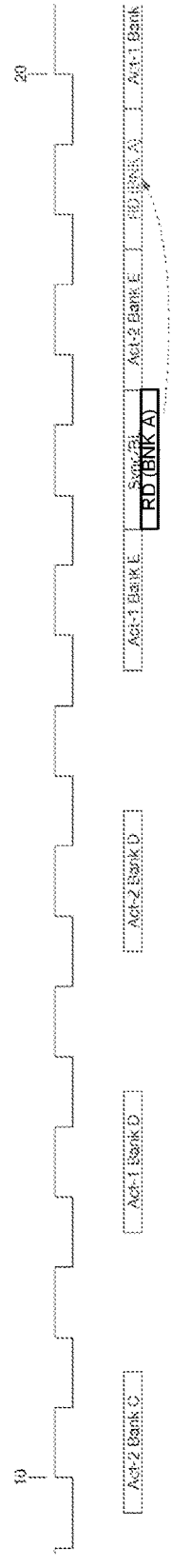
Figure 4C:
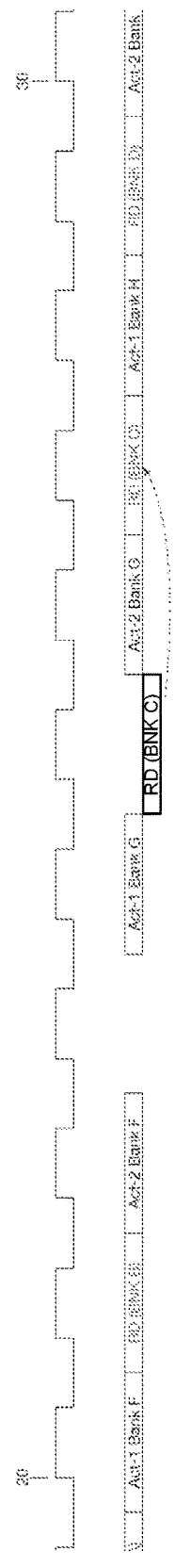
Figure 4G:
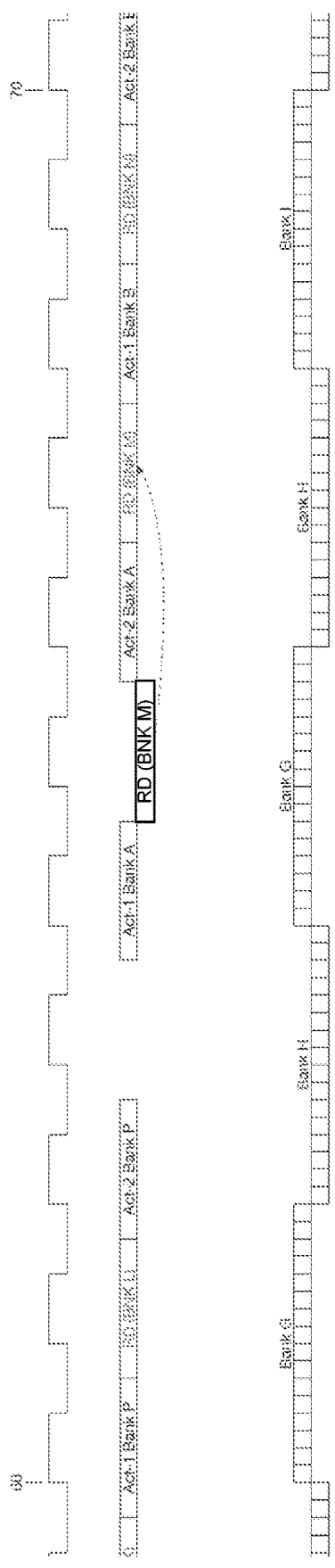
Figure 4H:
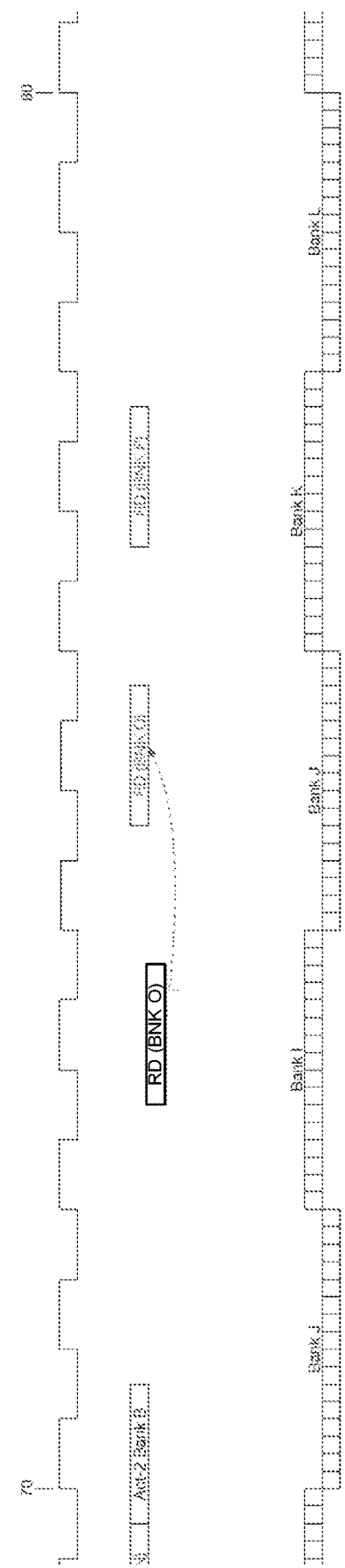
Figure 4I:
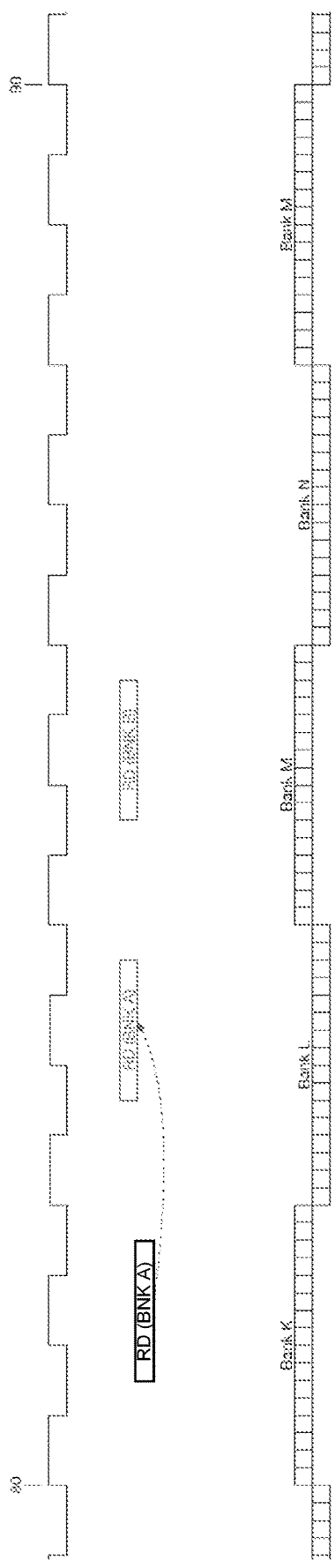
Figure 4J:
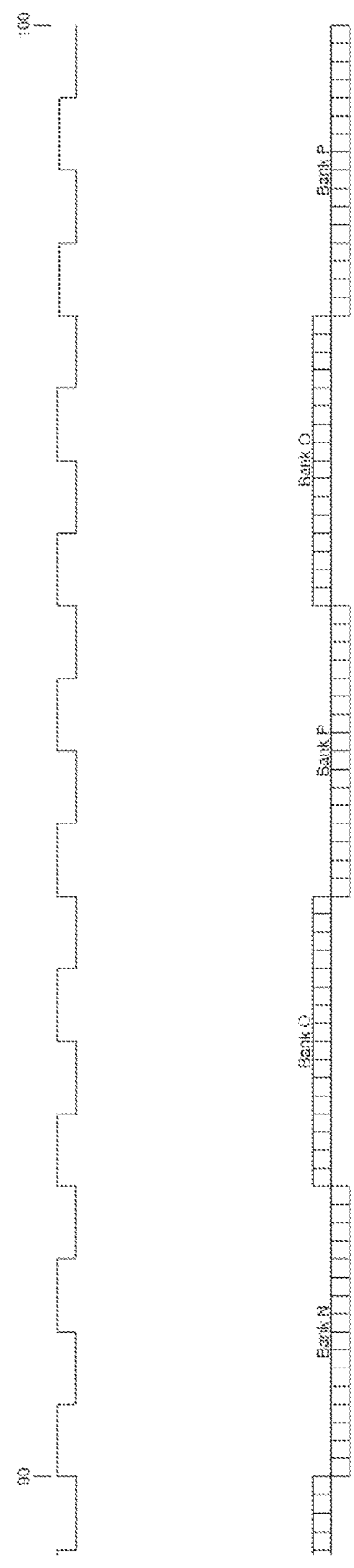
Figure 5D:
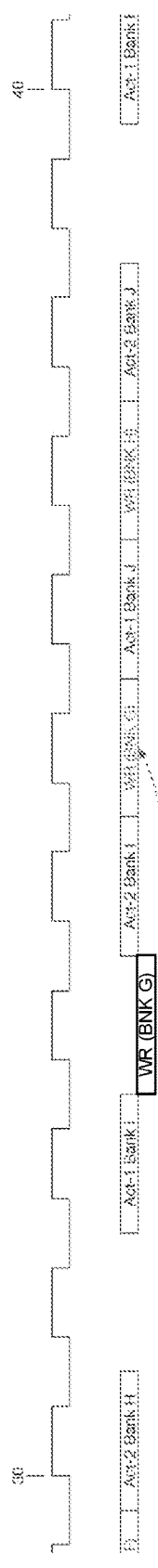
Figure 5D:
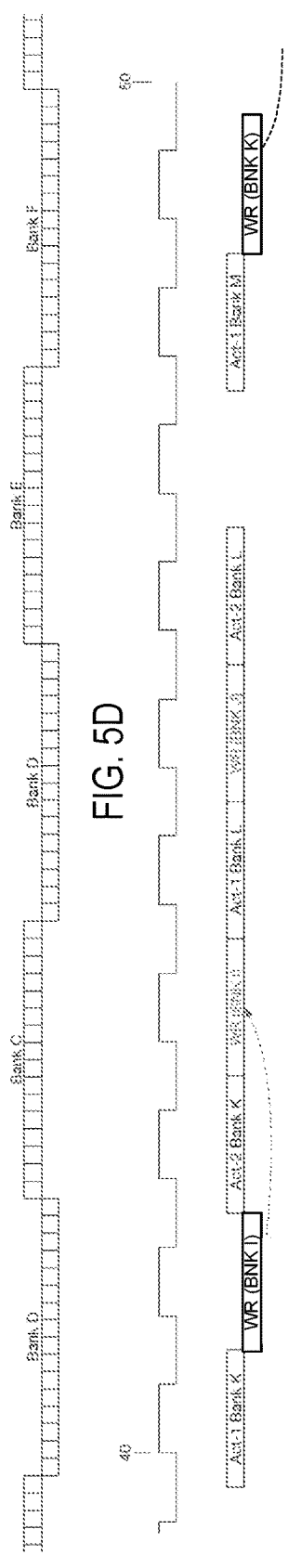
Figure 5E:
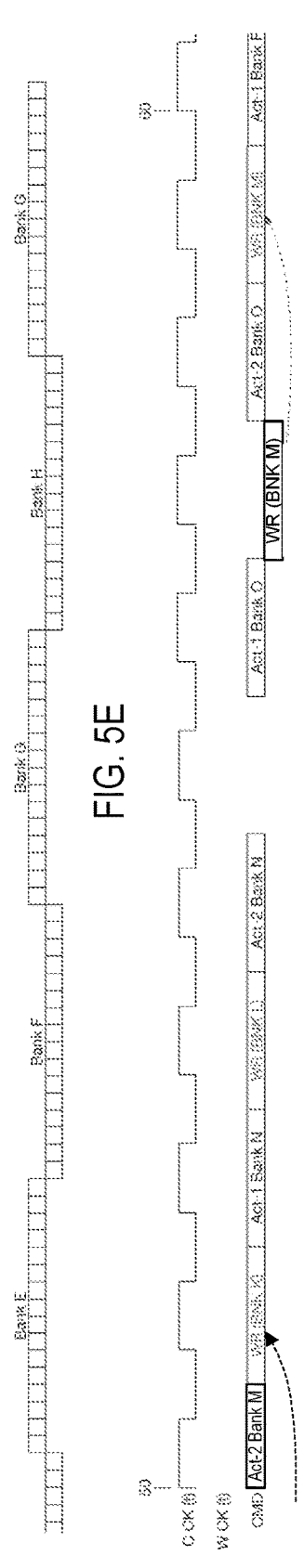
Figure 5F:
Figures 5G, 5H:
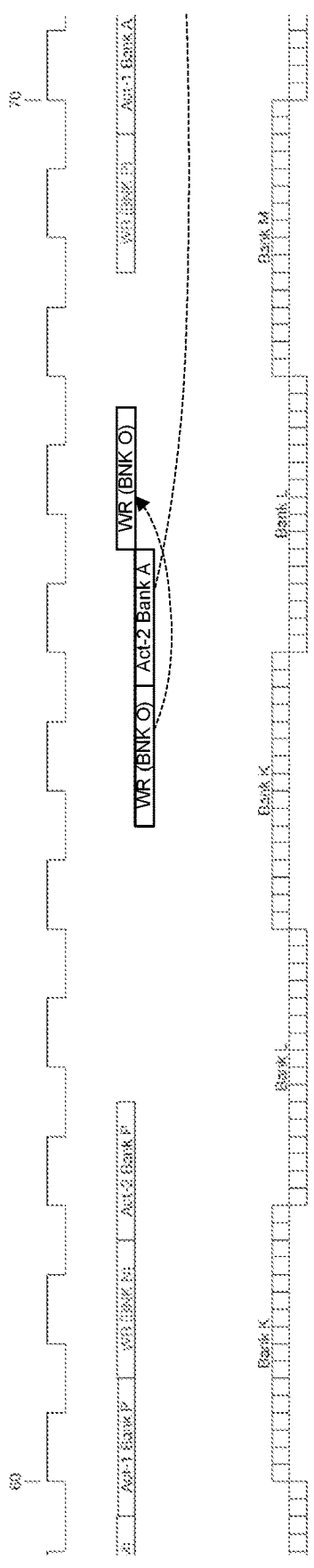
Figure 5I:
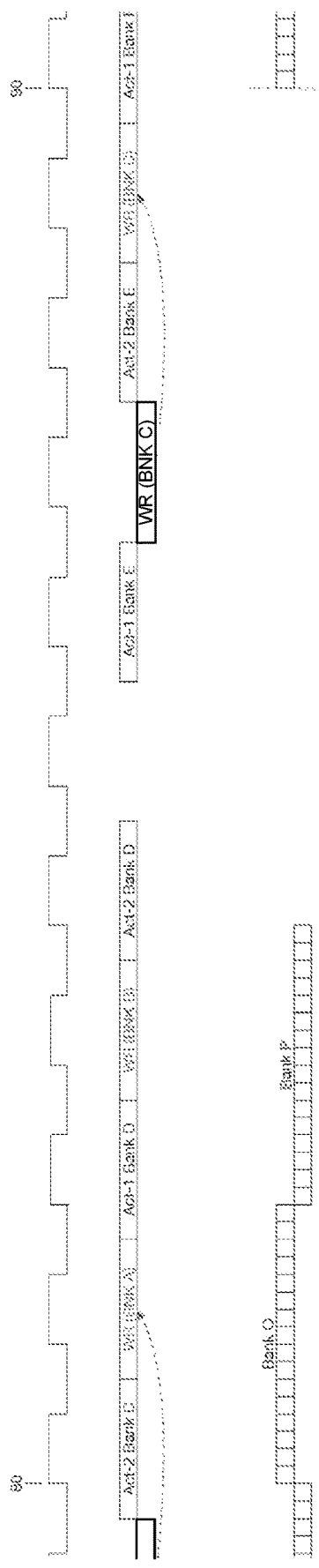
Figure 5J:
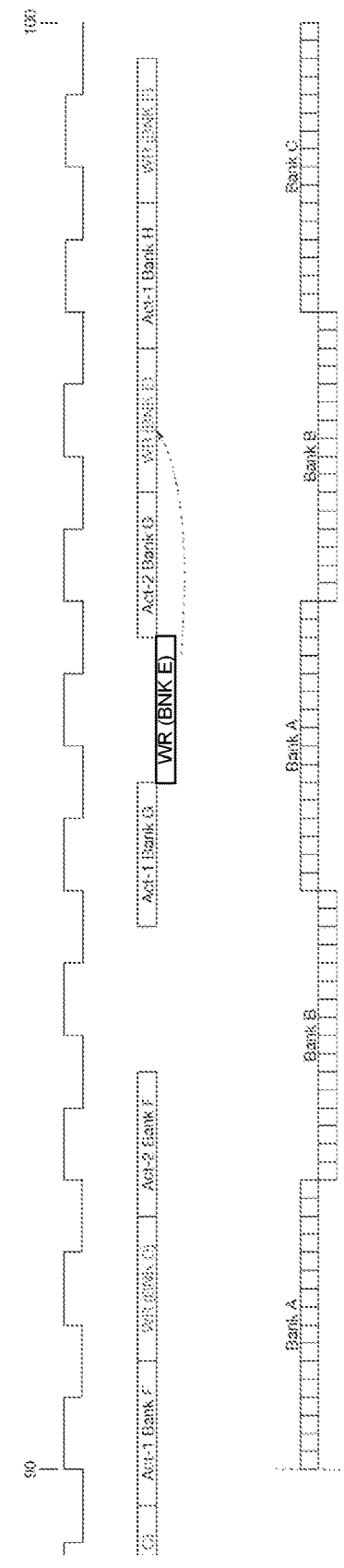
Figure 6G:
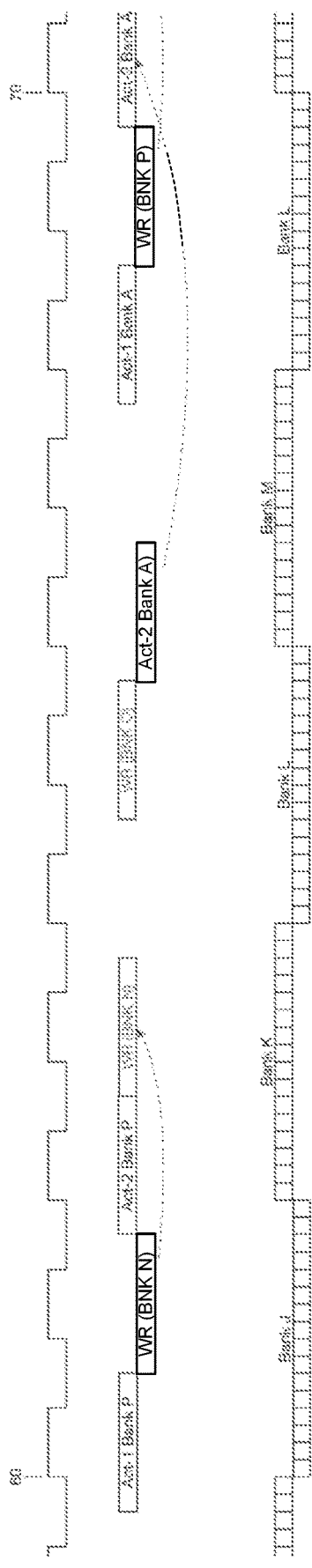
Figure 6H:
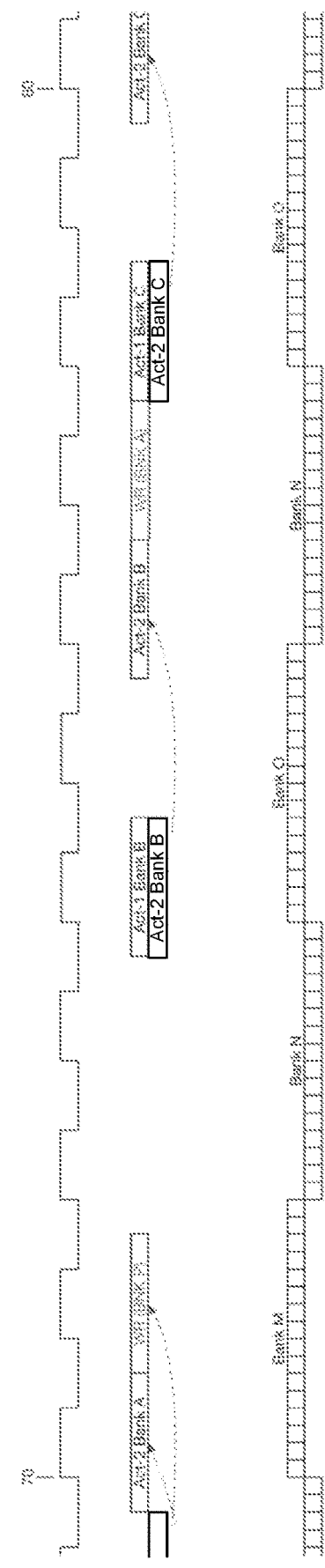
Figure 6I:
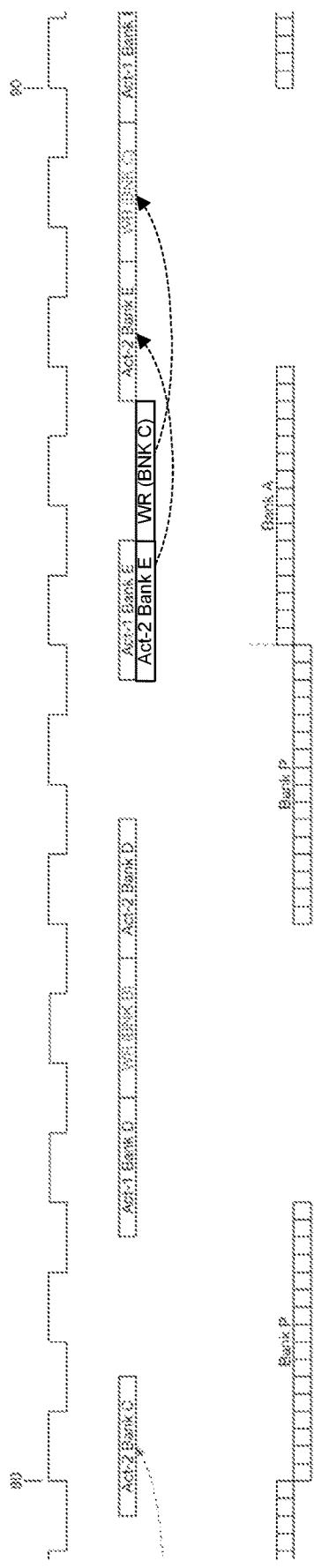
Figure 6J:
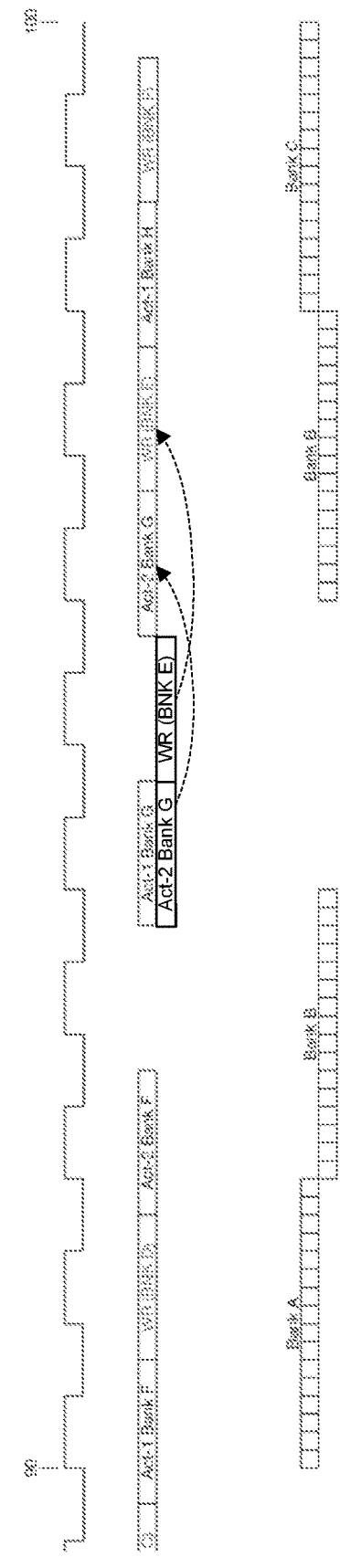

FIGS. 4A-J illustrate different portions of a single timing diagram for a read operation that is implemented according to the scheduling paradigm described with respect to FIG. 3F. Each of FIG. 4 illustrates 10-12 cycles of C CK, which corresponds to command clock signal 142. FIG. 4A starts at cycle 0 and FIG. 4J concludes at cycle 100. Sixteen banks (A-P) are addressed in this multi-bank memory operation. Dashed arrows indicate where every other read command is delayed two cycles beyond tRCDr (i.e., 17 cycles instead of 15 cycles after the second activate). Data begins appearing at cycle 36. Data bus 146 is maximally utilized between cycle 36 and cycle 100, when the second beat of data for the last bank (Bank P) is complete.

The implementation shown in FIGS. 4A-J has a repeating 2/6 cadence. The delay between the cycle number at which the RD command is scheduled for the first versus the second memory bank is two cycles, while the delay between the RD cycle number for the second and third banks is six cycles. This pattern may repeat until all banks are addressed.

FIGS. 5A-J illustrate different portions of a single timing diagram for a write operation that is also implemented according to the 2/6 timing pattern. The minimum timing parameters for the write differ from those of the read in some cases. Here tRCDw is 7 cycles and WL, which is the time delay between when the write command is scheduled and when write data can be written on the bus, is 9 cycles. Once again, data bus 146 is maximally utilized between cycles 20-83 (i.e., there are no gaps of data).

As noted, the operations depicted in FIGS. 4A-J and 5A-J follow the 2/6 timing cadence. Accordingly, read/write commands for a first given bank and a second, successive given bank to be addressed are scheduled two cycles of the command clock signal apart. Furthermore, read/write commands for the second given bank and a third, successive given bank to be addressed are scheduled six cycles of the command clock signal apart. This pattern repeats throughout the memory operation.

FIGS. 6A-J, on the other hand, illustrate different portions of a single timing diagram for a write operation that is implemented according to a 6/2 timing pattern. The write shown in this diagram has the same timing parameters as in FIGS. 5A-J: tRCDw is 7 cycles, and WL is 9 cycles. As with FIGS. 4A-J and 5A-J, it is still the case that every other write command is delayed by two cycles beyond the minimum timing parameter. But unlike the 2/6 timing pattern, in which odd-numbered accesses are delayed and even-numbered accesses are not delayed, the reverse is true for the 6/2 timing pattern. Here, the initial access (to Bank A) is not delayed, as the write data appears on the bus seven cycles after the second activate. The second access (to Bank B) is delayed by two cycles, and thus is scheduled for cycle 15. Unlike the 2/6 timing pattern, the 6/2 timing pattern shown in FIGS. 6A-J has two holes in the data bus between the initial and final data beats: there is a gap in clock cycles 20-21 and 82-83. Otherwise, the data bus bandwidth is fully utilized.

Accordingly, in the 6/2 timing pattern, read/write commands for a first given bank and a second, successive given bank to be addressed are scheduled six cycles of the command clock signal apart. Furthermore, read/write commands for the second given bank and a third, successive given bank to be addressed are scheduled two cycles of the command clock signal apart. This pattern repeats throughout the memory operation.

Example Method

Figure 7:
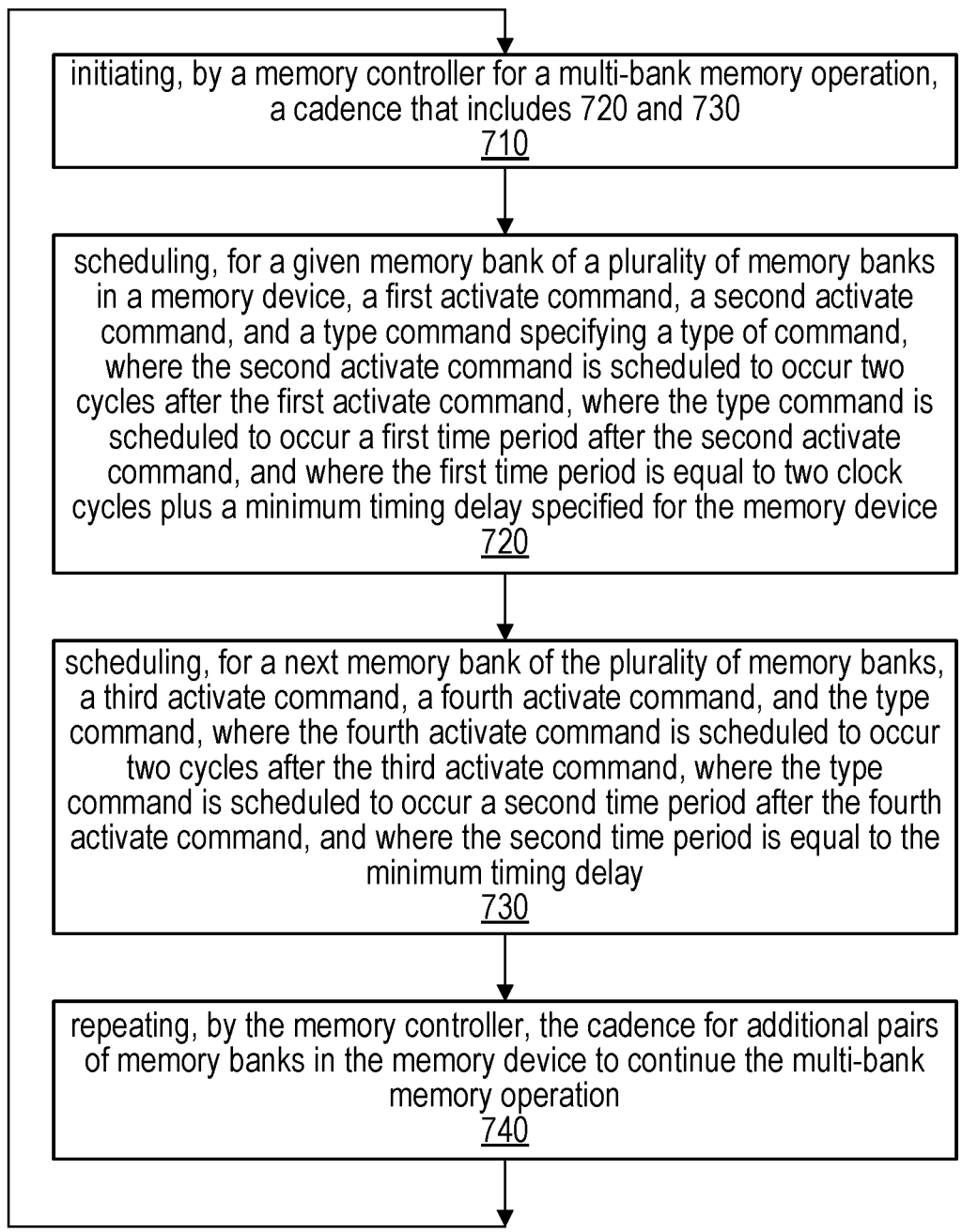
FIG. 7 is a flow diagram of one embodiment of a method for implementing the disclosed scheduled techniques.

FIG. 7 is a flow diagram illustrating one embodiment of a method for implementing the disclosed memory scheduling techniques. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

Method 700 commences at 710, in which a memory controller initiates a cadence for a multi-bank memory operation such as a burst operation. As described below, the cadence includes scheduling commands on an interface to a memory device relative to a clock signal that clocks the interface. In one embodiment, method 700 may be performed with respect to a synchronous DRAM device, such as a memory device compliant with the LP5 standard. The cadence includes 720 and 730, which are respectively performed relative to a given memory bank and a next memory bank in a sequence of memory banks addressed by the multi-bank memory operation. For example, 720 may be performed relative to Bank A in a memory, while 730 is performed relative to Bank B.

In 720, the memory controller schedules a first activate command, a second activate command, and a type command specifying a type of command to be performed (e.g., a read or write). The second activate command is scheduled to occur two clock cycles after the first activate command. Furthermore, the type command is scheduled to occur a first time period after the second activate command, where the first time period is equal to two clock cycles plus a minimum timing delay specified for the memory device. The minimum timing delay may correspond, for example, to a RAS-to-CAS delay that specifies the minimum amount of time that must pass from bank activation until a type command may appear on the command bus.

In some memory specifications, this minimum timing delay may be referred to as tRCDr for read commands and tRCDw for write commands. For example, if a read operation to Bank A were being scheduled in 720 and tRCDr=7 clock cycles, the read operation will be scheduled at least 9 clock cycles after the second activate command for Bank A (7 cycles of tRCDr plus 2 cycles of delay).

In 730, the memory controller schedules a third activate command, a fourth activate command, and another instance of the type command specified in 720. (The third and fourth activate commands are different instances of the first and second activate commands, respectively.) As in 720, the fourth activate command is scheduled to occur two clock cycles after the third activate command. The type command in 730 is scheduled to occur a second time period after the fourth activate command, where the second time period is equal to the minimum timing delay. For example, if a read operation to Bank B were being scheduled in 730 and tRCDr=7 clock cycles, the read operation will be scheduled 7 clock cycles after the fourth activate command for Bank B. Thus, unlike 720, the type command in 730 is scheduled such that it is not delayed beyond the minimum system timing requirement.

Next, in step 740, the memory controller repeats the cadence described in steps 720 and 730 for additional pairs of memory banks in the memory device in order to continue the multi-bank memory operation. For example, a next cadence might address Banks C and D, where the type command for Bank C is delayed by two cycles but the type command for Bank D is not delayed.

In various embodiments, the memory controller schedules activate commands on even cycles, while type commands such as read and write are scheduled to occur in intervening, odd cycles.

In embodiments in which activate commands are scheduled every other clock cycle (e.g., Bank A in cycles 0 and 2, Bank B in cycles 4 and 6, etc.), this can pose an issue with the implementation of the sync command, since the most power-efficient sync mode in the LP5 standard specifies that a sync command should be scheduled in the clock cycle immediately preceding a corresponding type command such as a read or write. This presents a potential issue in a paradigm in which a read/write command is preceded by a cycle reserved for activate commands (e.g., a read/write command scheduled for cycle 11 cannot be preceded by a sync command in cycle 10, since cycle 10 and other even cycles are reserved for activate commands).

Accordingly, the memory device may be equipped with a sync delay mode in which the memory device internally delays a received sync signal by one clock cycle upon receipt. This allows the paradigm of reserving every other clock cycle for activate commands to work in the context of LP5 memory. In such embodiments, method 700 may further include the memory controller setting a sync delay mode for the memory device, and then scheduling a sync command two clock cycles prior to a corresponding type command for an initial bank addressed in the multi-bank memory operation.

One effect of method 700 may be to increase utilization of the memory data bus during the multi-bank memory operation. In some memories such as LP5, the frequencies for moving data into or out of the memory are sufficiently high that data associated with a bank access includes two beats of data, each of which is two clock cycles long. Also due to timing, the two beats are separated by two clock cycles. This allows for interleaving of data from different banks. Indeed, applying embodiments of method 700 may lead to full utilization of the data bus once the initial latency of the memory device has passed and data for the multi-bank memory operation begins appearing on the data bus.

Example Device

Figure 8:
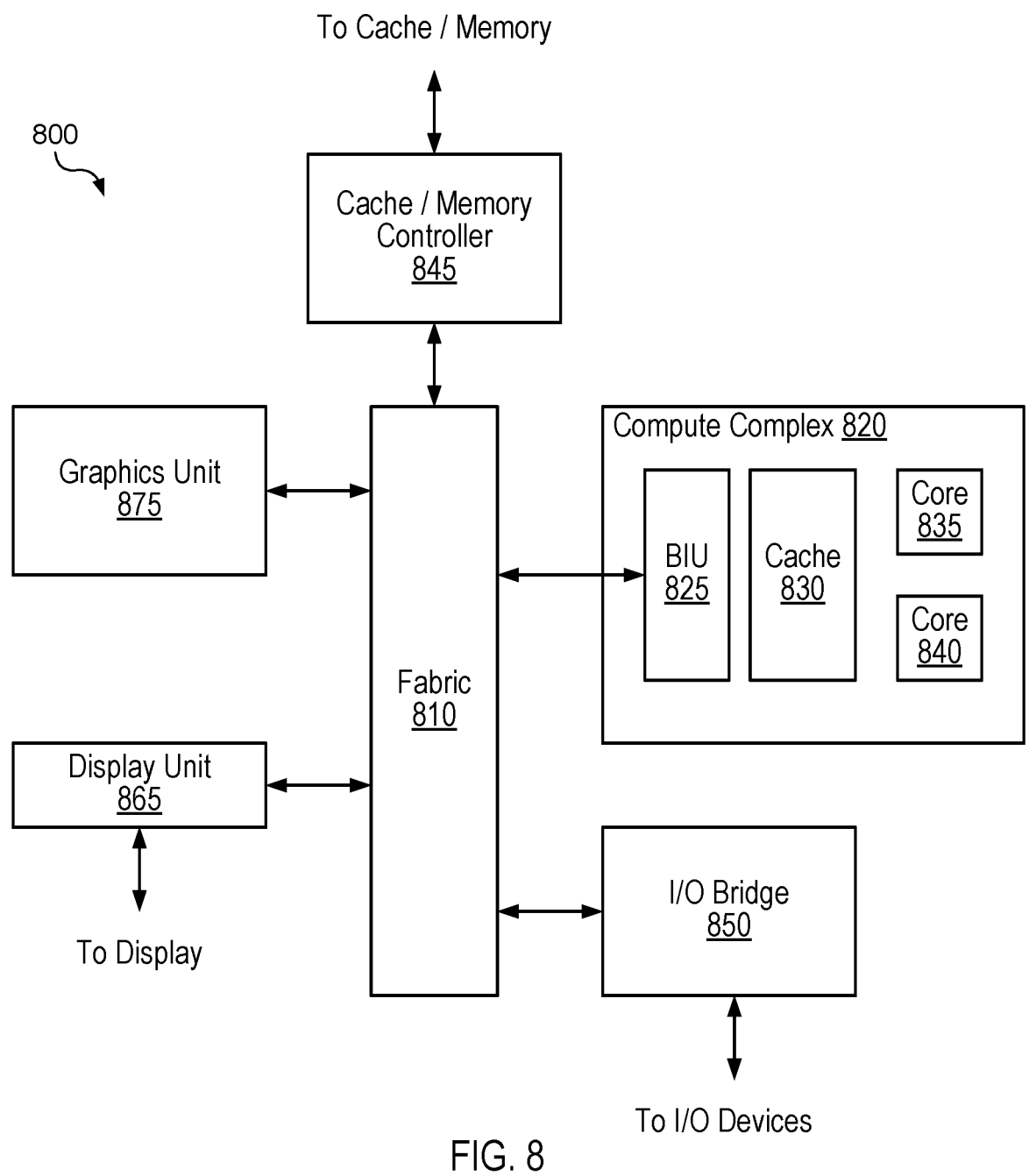
FIG. 8 is a block diagram illustrating an example computing device for implementing the disclosed techniques.
Figure 9:
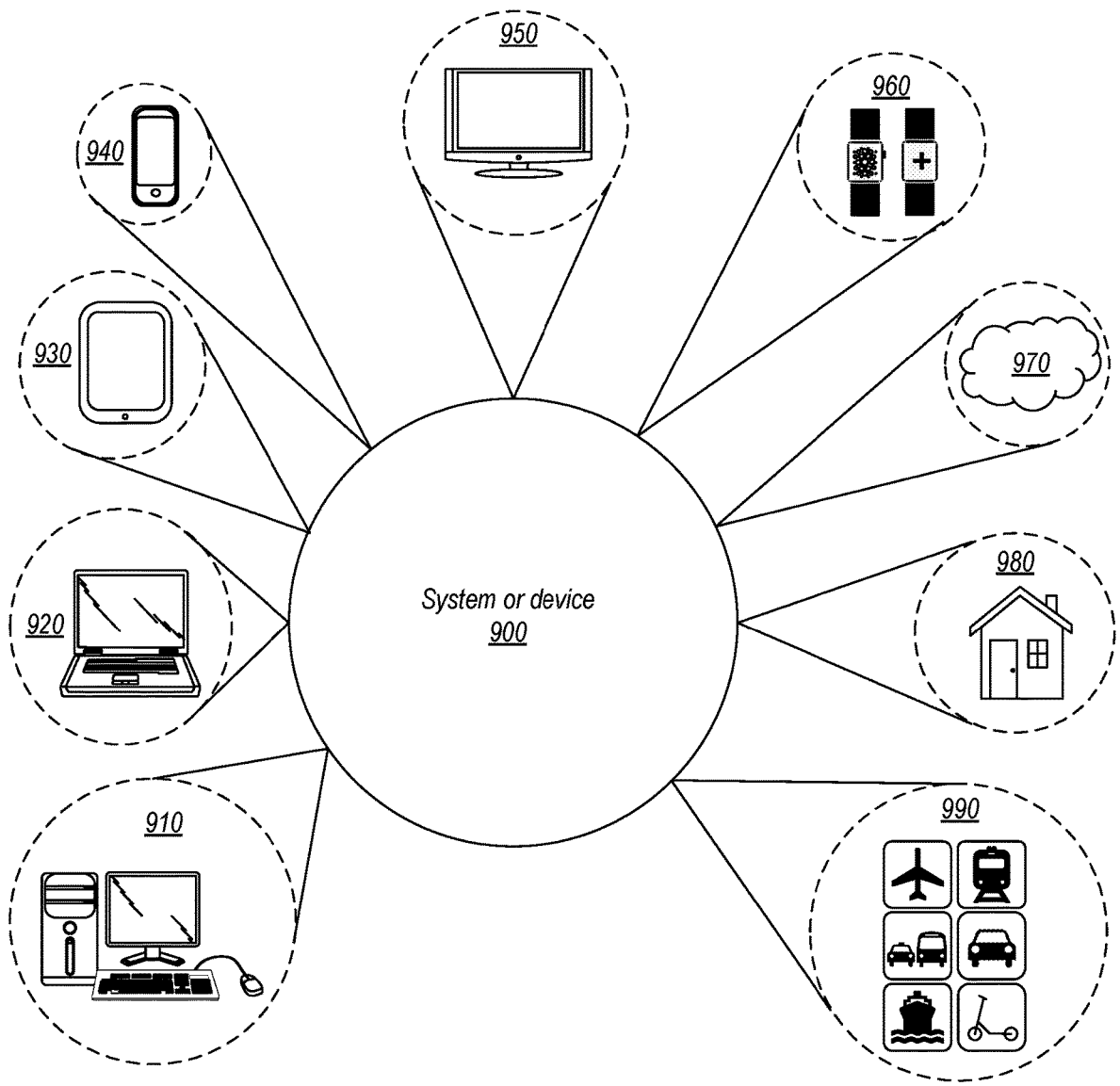
FIG. 9 is a diagram illustrating example applications for systems and devices employing the disclosed techniques.

Referring now to FIG. 8, a block diagram illustrating an example embodiment of a device 800 is shown. In some embodiments, elements of device 800 may be included within a system on a chip. In some embodiments, device 800 may be included in a mobile computing device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Graphics unit 875 may include one or more processors, e.g., one or more graphics processing units (GPU's). Graphics unit 875 may receive graphics-oriented instructions, such as OPENGL®, Metal, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

Display unit 865 may be configured to read data from a frame buffer and provide a stream of pixel values for display. Display unit 865 may be configured as a display pipeline in some embodiments.

Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 800 with connectivity to various types of other devices and networks.

Example Applications

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 10:
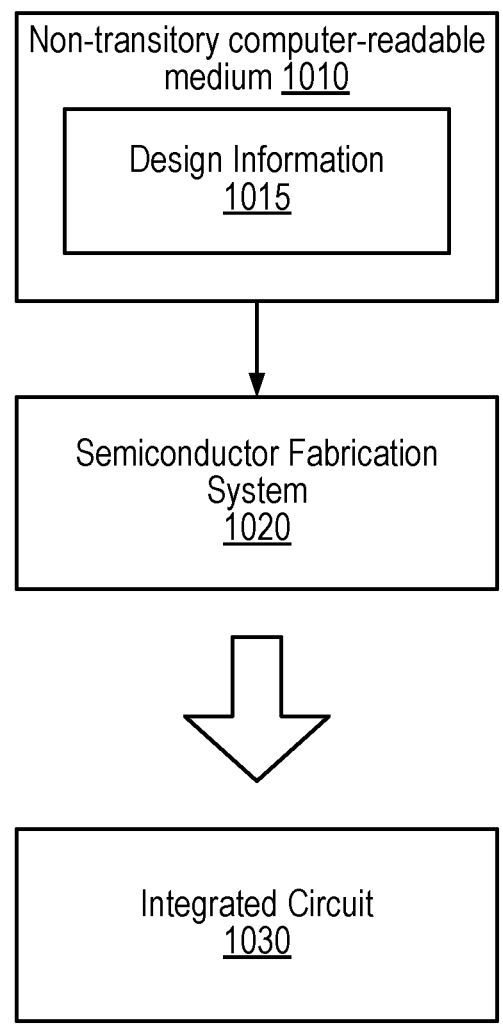
FIG. 10 is a block diagram illustrating an example computer-readable medium that stores circuit design information for implementing devices that employ the disclosed techniques.

FIG. 10 is a block diagram illustrating an example non-transitory computer-readable storage medium that stores circuit design information, according to some embodiments. In the illustrated embodiment semiconductor fabrication system 1020 is configured to process the design information 1015 stored on non-transitory computer-readable medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system 1020. In some embodiments, design information 1015 may also include one or more cell libraries which specify the synthesis, layout, or both of integrated circuit 1030. In some embodiments, the design information is specified in whole or in part in the form of a netlist that specifies cell library elements and their connectivity. Design information 1015, taken alone, may or may not include sufficient information for fabrication of a corresponding integrated circuit. For example, design information 1015 may specify the circuit elements to be fabricated but not their physical layout. In this case, design information 1015 may need to be combined with layout information to actually fabricate the specified circuitry.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown in FIG. 1 or 2. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s)

of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
 a memory interface circuit configured to couple to a memory device via an interface having a command bus that is clocked by a command clock signal, wherein the memory device includes a plurality of banks; and
 a control circuit coupled to the memory interface circuit and configured to initiate a multi-bank memory operation by scheduling a sequence of bank-specific commands to be sent over the command bus to the memory device, wherein the bank-specific commands for a given memory bank include:
  a first activate command, followed by a second activate command two cycles of the command clock signal later; and
  a read/write command that follows the second activate command by at least a minimum timing parameter specified for the memory device, wherein the read/write command specifies a type of operation to be performed; and
  wherein every other read/write command during the multi-bank memory operation is scheduled to be delayed beyond the minimum timing parameter, and
  wherein remaining read/write commands are scheduled to not be delayed beyond the minimum timing parameter.

2. The apparatus of claim 1, wherein the multi-bank memory operation is a burst operation, and wherein the control circuit is configured to:
  schedule an activate command on every other clock cycle of the command bus to perform the multi-bank memory operation; and
  schedule other types of commands on intervening clock cycles.

3. The apparatus of claim 2, wherein every other read/write command during the multi-bank memory operation, starting with an initial read/write command, is scheduled to be delayed two cycles beyond the minimum timing parameter.

4. The apparatus of claim 2, wherein every other read/write command during the multi-bank memory operation, starting with a read/write command following an initial read/write command, is scheduled to be delayed two cycles beyond the minimum timing parameter.

5. The apparatus of claim 1, wherein the sequence of bank-specific commands addresses each of the plurality of banks during one or more passes, beginning with an initial bank and ending with a final bank; and
  wherein commands in the sequence of bank-specific commands are scheduled such that, during a particular pass through the plurality of banks, there is full utilization of a data bus of the interface during a time period between which data for the initial bank and data for the final bank is present on the data bus.

6. The apparatus of claim 2, wherein the interface includes a data bus clocked by a data clock signal, wherein the control circuit is configured to set the memory device into a particular mode for the multi-bank memory operation, wherein the particular mode causes the memory device to delay, in response to a sync command, one clock cycle before starting the data clock signal, and wherein the control circuit is further configured to:
  schedule, when the particular mode is active, the sync command two clock cycles prior to scheduling of a read/write command for an initial bank addressed in the multi-bank memory operation.

7. The apparatus of claim 6, wherein in response to the read/write commands being read commands, the minimum timing parameter specifies a minimum RAS-to-CAS delay for read operations (tRCDr) between a second activate for a given memory bank and a read command for the given memory bank; and
  wherein every other read command during the multi-bank memory operation is delayed two cycles of the command clock signal beyond tRCDr, while remaining read commands are scheduled at a time equal to tRCDr after a corresponding second activate command.

8. The apparatus of claim 6, in response to the read/write commands being write commands, the minimum timing parameter specifies a minimum RAS-to-CAS delay for write operations (tRCDw) between a second activate for a given memory bank and a write command for the given memory bank; and
  wherein every other write command during the multi-bank memory operation is delayed two cycles of the command clock signal beyond tRCDw, while remaining write commands are scheduled at a time equal to tRCDw after a corresponding second activate command.

9. The apparatus of claim 1, wherein the apparatus is a mobile computing device that includes the memory device.

10. The apparatus of claim 9, wherein the memory device is compliant with JEDEC JESD209-5, Low Power Double Data Rate 5 (LPDDR5).

11. A method, comprising:
  initiating, by a memory controller for a multi-bank memory operation, a cadence that includes:
    scheduling, for a given memory bank of a plurality of memory banks in a memory device, a first activate command, a second activate command, and a type command specifying a type of command, wherein the second activate command is scheduled to occur two cycles after the first activate command, wherein the type command is scheduled to occur a first time period after the second activate command, and wherein the first time period is equal to two clock cycles plus a minimum timing delay specified for the memory device; and
    scheduling, for a next memory bank of the plurality of memory banks, a third activate command, a fourth activate command, and the type command, wherein the fourth activate command is scheduled to occur two cycles after the third activate command, wherein the type command is scheduled to occur a second time period after the fourth activate command, and wherein the second time period is equal to the minimum timing delay; and
  repeating, by the memory controller, the cadence for additional pairs of memory banks in the memory device to continue the multi-bank memory operation.

12. The method of claim 11, wherein the multi-bank memory operation is a burst operation, and wherein, to perform the burst operation, the memory controller schedules activate commands to occur every other cycle, and schedules type commands to occur in intervening cycles between those scheduled for activate commands.

13. The method of claim 12, wherein the minimum timing delay is a RAS-to-CAS delay specified for the memory device, and wherein the memory device is a synchronous dynamic random-access memory (SDRAM).

14. The method of claim 13, furthering comprising:
  setting, by the memory controller, a sync delay mode for the memory device; and
  scheduling, by the memory controller, a sync command two clock cycles prior to scheduling of a type command for an initial bank addressed in the multi-bank memory operation; and
  wherein the sync delay mode causes the memory device to internally delay a received sync command for one cycle.

15. The method of claim 13, wherein data for a given memory bank in the multi-bank memory operation includes two beats of data on a data bus of the memory device, each beat of which is two clock cycles long, wherein the two beats are separated by two clock cycles, and wherein repeating the cadence interleaves data from different memory banks to increase utilization of the data bus during the multi-bank memory operation.

16. An apparatus, comprising:
a computer system including:
one or more processor circuits;
a communication fabric;
a memory controller configured to receive memory requests from the one or more processor circuits via the communication fabric; and
a memory system coupled to the memory controller via an interface that includes a command bus and a data bus, wherein the memory system includes a plurality of memory devices that include multiple memory banks that are accessible using activate and read/write commands, wherein the plurality of memory devices have a minimum timing delay between an activation sequence and a corresponding read/write command when accessing a given memory bank; and
wherein the memory controller is configured, in response to receiving a request for a burst memory operation to a particular one of the plurality of memory devices, to schedule, on the command bus, a sequence of read/write commands to a set of memory banks within the particular memory device such that alternating ones of the read/write commands in the sequence are scheduled to be delayed by a multi-cycle window beyond the minimum timing delay, wherein remaining read/write commands in the sequence are scheduled to not be delayed beyond the minimum timing delay.

17. The apparatus of claim 16, wherein the plurality of memory devices are accessed by using two activation commands for a given memory bank, wherein the memory controller is configured to schedule activation commands to occur every other clock cycle and to schedule other commands to occur on intervening clock cycles.

18. The apparatus of claim 17, wherein the minimum timing delay is a RAS-to-CAS delay specified for the plurality of memory devices, and wherein the multi-cycle window is two clock cycles of a clock signal of the command bus.

19. The apparatus of claim 18, wherein the plurality of memory devices have an operating mode in which a sync command received from the memory controller is delayed by one or more clock cycles before starting a clock signal of the data bus, and wherein the memory controller is configured to set the particular memory device into the operating mode in order to perform the burst memory operation.

20. The apparatus of claim 18, wherein the sequence of read/write commands are scheduled such that data from the set of memory banks is fully interleaved on the data bus.

* * * * *